United States Patent
Anderson et al.

(10) Patent No.: US 8,739,696 B2
(45) Date of Patent: Jun. 3, 2014

(54) DOUGH PREPARING MACHINE

(75) Inventors: Rick Anderson, Waterville, OH (US); John Michael, Toledo, OH (US); Dan Roman, Toledo, OH (US); Tim Hancock, Malinta, OH (US)

(73) Assignee: InSitu Foods, Inc., Toledo, OH (US)

( * ) Notice: Subject to any disclaimer, the term of this patent is extended or adjusted under 35 U.S.C. 154(b) by 470 days.

(21) Appl. No.: 13/125,943

(22) PCT Filed: Oct. 23, 2009

(86) PCT No.: PCT/US2009/061799
§ 371 (c)(1),
(2), (4) Date: Apr. 25, 2011

(87) PCT Pub. No.: WO2010/048487
PCT Pub. Date: Apr. 29, 2010

(65) Prior Publication Data
US 2011/0203463 A1    Aug. 25, 2011

Related U.S. Application Data

(60) Provisional application No. 61/107,736, filed on Oct. 23, 2008.

(51) Int. Cl.
A47J 43/00    (2006.01)
A23G 1/10    (2006.01)
A21B 1/00    (2006.01)

(52) U.S. Cl.
USPC .......................................... 99/507; 425/307

(58) Field of Classification Search
USPC ........... 99/485, 486, 537, 348, 352, 353, 509; 126/19 R
See application file for complete search history.

(56) References Cited

U.S. PATENT DOCUMENTS

| 2,618,227 | A | * | 11/1952 | Schmittroth | 425/95 |
| 4,095,926 | A | * | 6/1978 | Paul | 425/307 |
| 4,428,680 | A | * | 1/1984 | Persson et al. | 366/296 |
| 4,767,638 | A | * | 8/1988 | Uhrovic | 426/500 |
| 5,479,850 | A | * | 1/1996 | Anderson | 99/357 |
| 5,538,414 | A | * | 7/1996 | Kobayashi et al. | 425/321 |
| 5,895,196 | A |   | 4/1999 | Forsyth | |
| 6,524,090 | B1 | * | 2/2003 | Hayashi et al. | 425/140 |

(Continued)

FOREIGN PATENT DOCUMENTS

| EP | 1550499 A2 | 7/2005 |
| EP | 1550500 A2 | 7/2005 |

(Continued)

Primary Examiner — Jianying Atkisson
(74) Attorney, Agent, or Firm — Gifford, Krass, Sprinkle, Anderson & Citkowski, P.C.

(57) ABSTRACT

A dough preparing machine for preparing dough is provided. The dough preparing machine includes a dough batching system for assembling dry ingredients, a dough mixing device, and a dough compressing and dividing device. The dough preparing machine is operable to produce customizable and discrete loaves of dough for baking. The dough preparing machine gathers necessary ingredients for making dough, mixes the dough to a desired consistency, and divides the dough. The mixing device is configured to mix the dough in a bowl and transfer the dough to a container for compressing and dividing operations. The compressing and dividing device includes a first plate having a plurality of blocks and a second plate having a plurality of blades. The blades are configured to slide between the blocks after compressing operations and divide the dough.

45 Claims, 15 Drawing Sheets

(56) References Cited

U.S. PATENT DOCUMENTS

| | | |
|---|---|---|
| 7,328,652 B2 | 2/2008 | McNamee |
| 7,827,929 B2 * | 11/2010 | Garrison et al. ............... 118/16 |
| 7,866,877 B2 | 1/2011 | Fay et al. |
| 2004/0028767 A1 | 2/2004 | McNamee |
| 2008/0151682 A1 | 6/2008 | Fay et al. |
| 2008/0289466 A1 * | 11/2008 | Takama et al. ............... 83/155 |
| 2009/0067279 A1 | 3/2009 | Mulle et al. |
| 2009/0161478 A1 | 6/2009 | Gustafson et al. |
| 2010/0085832 A1 | 4/2010 | Wells |
| 2011/0059211 A1 | 3/2011 | Chandi et al. |
| 2011/0075506 A1 | 3/2011 | Kafer et al. |

FOREIGN PATENT DOCUMENTS

| | | |
|---|---|---|
| EP | 2095870 A2 | 9/2009 |
| GB | 2453546 A | 4/2009 |
| WO | WO-9632845 A1 | 10/1996 |
| WO | WO-2004010786 A1 | 2/2004 |
| WO | WO-2007075167 A1 | 7/2007 |
| WO | WO-2009041836 A1 | 4/2008 |
| WO | WO-2009041835 A1 | 4/2009 |

\* cited by examiner

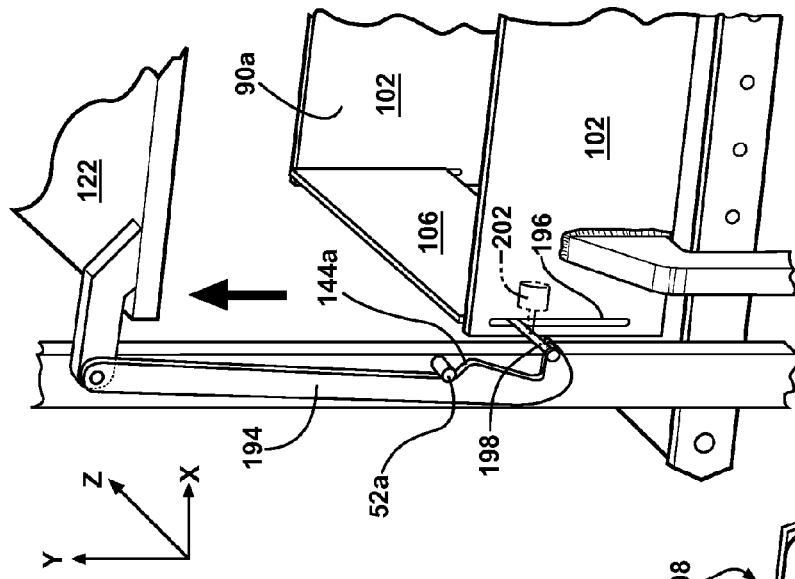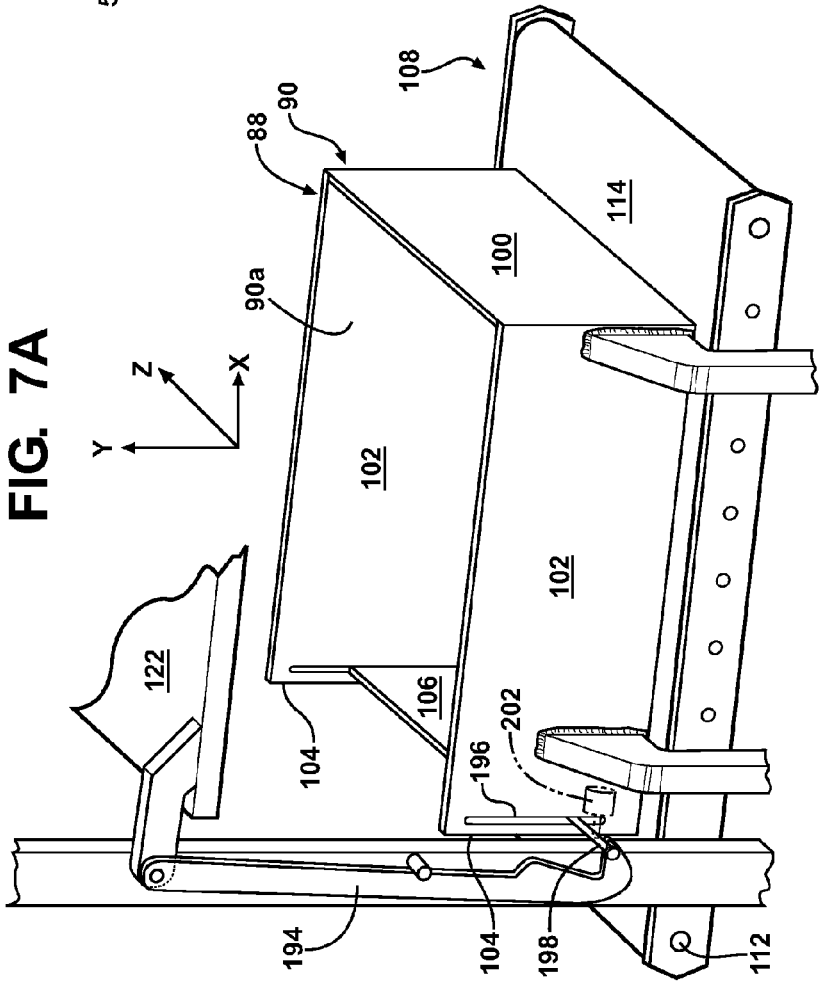

DOUGH PREPARING MACHINE

CROSS-REFERENCE TO RELATED APPLICATION

This application claims priority of U.S. Provisional Patent Application Ser. No. 61/107,736 filed Oct. 23, 2008, which is incorporated herein by reference.

BACKGROUND OF THE INVENTION

1. Field of the Invention

A dough preparing machine operable to gather ingredients so as to prepare dough and form the dough into individual loaves for baking.

2. Description of the Prior Art

Dough preparation is labor intensive and requires numerous steps. The steps for preparing dough for baking are relatively simple: gather the proper ingredients, mix the ingredients to a desired consistency, divide the mixed dough, round and mold the divided dough, and proof the dough. Current systems that mix or divide dough result in a lot of waste.

Automated batching devices are known. For instance, U.S. Pat. No. 3,794,234 to Pardo discloses a dough batching device having a funnel providing ingredients to a cavity, and a rotating member in the cavity operable to rotate within the cavity and deliver a predetermined amount of ingredients. Other batching devices such as the batching device set forth in U.S. Pat. No. 5,314,095 to Deal disclose a system for dispensing a predetermined amount of granular material based upon volume. Specifically, Deal teaches a batching device having a chamber of a predetermined volume rotated to accept granular material in one position and dump the contents of the chamber in another position. However, these devices are costly and are not easily adaptable to meter out varying ingredient amounts.

Dough mixers typically include a bowl and a mixer arm. The mixer arm may be lowered into the bowl and pivoted about the bowl so as to mix the dough ingredients together. Current dough mixers have the drive disposed above the bowl. The drive rotates an arm about a center point. However, in order to dump the contents of the bowl, the mixer arm needs to be removed and cleared from the bowl so that the bowl may be tipped and the contents dispensed freely. Other dough mixers move the bowl relative to a fixed mixer arm. Positioning the mixer arm free of the bowl for dumping operations is not desirable for mass production as this step reduces the efficiency of the dough production. Thus it is desirable to have a bread dough mixer or dough preparing machine wherein the delivery of mixed dough may be quickened relative to the current art.

Bread dough is currently divided and delivered for further processing using various devices such as a volumetric divider, a pneumatic divider where a predetermined amount of dough is squeeze out of a chamber, or a two-step method. With respect to the two-step method, in the first step the dough is compressed in a container and in the second step the dough is cut into individual loaves. This process involves the placement of the dough into the dividing container, pressing the dough, cutting the dough, and then removing the loaves from the dividing container so as to ready the individual loaves for proofing. Current automated dividing processes are done by having the blades come upwardly to press the dough against a platform. The divided dough then must be manually collected for further processing. The individual loaves are then separated and moved into a proofing station where each individual loaf is rounded and molded before being proofed and baked. Thus it is desirable to have a dividing process wherein the current steps can be reduced and automated so as to facilitate the production of bread, specifically the need to manually unload the dividing container.

SUMMARY OF THE INVENTION AND ADVANTAGES

A machine for preparing dough into individual loaves. The machine has a housing for supporting components and devices operable to gather ingredients, mix the ingredients together into dough, compress and divide the dough, and other operations necessary to prepare the dough for baking. The machine is controlled by a controller. Preferably the machine has a controller, such as a programmable logic controller, for controlling dough preparing operations. The controller may be in communication with a database. The database stores recipes for dough. The machine includes a batching system, a mixing device, and a compressing and dividing device. The batching system is operable to gather dry ingredients necessary for the production of a particular dough.

The batching system further includes a plurality of bins mounted to the housing. Each bin has an opening and holds ingredients for making dough. A tray is disposed beneath the opening of the bin. The batching system further includes a metering device for dispensing discrete quantities of selected ingredients. The metering device may include a vibratory device in communication with the controller, and a scale in communication with the batch container and the controller. The controller actuates the carriage drive to move to each bin having an ingredient in a selected recipe. When the batch container is positioned at a selected tray, the controller actuates the vibratory device of the selected tray so as to induce the ingredient to leave the tray and fall into the batch container.

The batch of ingredients may be deposited into the mixing device. The mixing device is operable to mix the batch of ingredients with wet ingredients so as to form dough of a desired consistency. The wet ingredients may be manually or automatically introduced to the batch of ingredients. The mixing device is mounted onto the housing. The mixing device includes a bowl having an inner wall surface. The inner wall surface includes a bottom wall surface, a sidewall, and an inner sidewall extending from the bottom of the bowl so as to define an elongated chamber disposed within the sidewalls of the bowl. The bottom wall surface of the bowl has an aperture, and the elongated chamber extends between the sidewall of the bowl and is in communication with the aperture.

The mixing device further includes a disc mounted to the bottom wall surface of the bowl, and a mixer shaft disposed within the elongated chamber. The mixer shaft has a support arm extending generally orthogonal from the free end of the mixer shaft. A mixer arm extends generally orthogonal from the free end of the support arm so as to be disposed within the bowl.

The mixing device further includes a first drive operable to rotate the disc along a first plane so as to rotate the bowl. The first drive is further operable to rotate the mixer arm in a direction opposite the bowl. The bowl and the mixer arm are rotated along the same plane. A tipping drive is attached to the bowl. The tipping drive is operable to rotate the bowl along a second plane orthogonal to the first plane so as to dump the dough from the bowl.

The dough is transferred to the compressing and dividing device. The compressing and dividing device is operable to compress the dough and divide the dough into uniform loaves. The compressing and dividing device includes a dividing container having an end wall, a pair of sidewalls extending from the end wall, and a movable wall extending between the free ends of the sidewalls. The movable wall is displaceable with respect to the sidewalls so as to form an opening for which divided dough may exit for further processing.

The compressing and dividing device includes a conveyor having a belt. The conveyor is mounted onto the housing. The compressing and dividing device may further include a conveyor drive and a belt drive both in communication with the controller. The belt drive is operable to rotate the belt so as to advance divided dough forward for further processing. The conveyor drive is operable to move the conveyor between the mixing device and the dough compressing and dividing device. The dividing container is fixedly mounted above the conveyor belt. The conveyor drive is operable to position the dividing container to receive the mixed dough from the mixing device, and then to position the dividing container for compressing and dividing operations.

The compressing and dividing device further includes a first plate, a second plate, and a drive shaft movable along a drive axis orthogonal to a first axis as indicated in the figures by "X". The second plate is fixedly mounted to the drive shaft and includes a plurality of blades. A coupling device is fixedly mounted to the first plate. The coupling device is in communication with the controller and is operable to engage and release the first plate with respect to the drive shaft. The first plate includes a plurality of blocks and a plurality of elongated supports. Each of the plurality of supports interconnects respective blocks to the first plate, and each of the plurality of blocks is evenly spaced apart from the other. Each block has a planar surface for compressing dough. The coupling device is operable to fix the first plate onto the drive shaft and position respective blades between the plurality of blocks so as to place the edge of the plurality of blades in alignment with the planar surface of the plurality of blocks.

The compressing and dividing device further includes an inner housing. The inner housing has an inner housing wall having a predetermined thickness. The inner housing wall has an outer wall surface configured to fit within the inner wall surfaces of the dividing container. The inner housing is releasably attached to the second plate so as to drop into the dividing container prior to compressing operations. The controller is operable to actuate the drive shaft so as to move the first and second plates towards engagement with the dough held within the dividing container. The inner housing is disengaged from the second plate so as to line the inner wall surface of the dividing container prior to the blocks engaging the dough. The blocks are pressed into engagement with the dough so as to uniformly distribute the dough within the inner housing. The controller is further operable to actuate the coupling device and release the first plate from engagement with the drive shaft so as to further drive the second plate downwardly. The blades then engage a support plate disposed underneath the first belt surface so as to divide the dough. The controller is then operable to actuate the drive shaft so as to move the second plate away from the conveyor. The inner housing is operable to engage the second plate. As the second plate is lifted from the conveyor, the movable wall is displaced so as to provide an opening for the divided dough to exit. The controller then actuates the belt so as to advance the divided dough from the opening of the dividing container for further processing.

Accordingly the present invention reduces the steps currently required to process dough. Additionally, the present invention processes dough more efficiently, by reducing the amount of dough being wasted, making the process more efficient. Furthermore, the present invention makes the individual loaves uniform to ensure the same batch of dough is consistent after baking.

BRIEF DESCRIPTION OF THE DRAWINGS

FIG. 7a is a perspective view of the dividing container showing the movable wall enclosing the sidewalls;

FIG. 7b is a perspective view of the dividing container showing the movable wall displaced from the sidewalls so as to form a passage for dough;

DETAILED DESCRIPTION OF THE INVENTION

Figure 1:
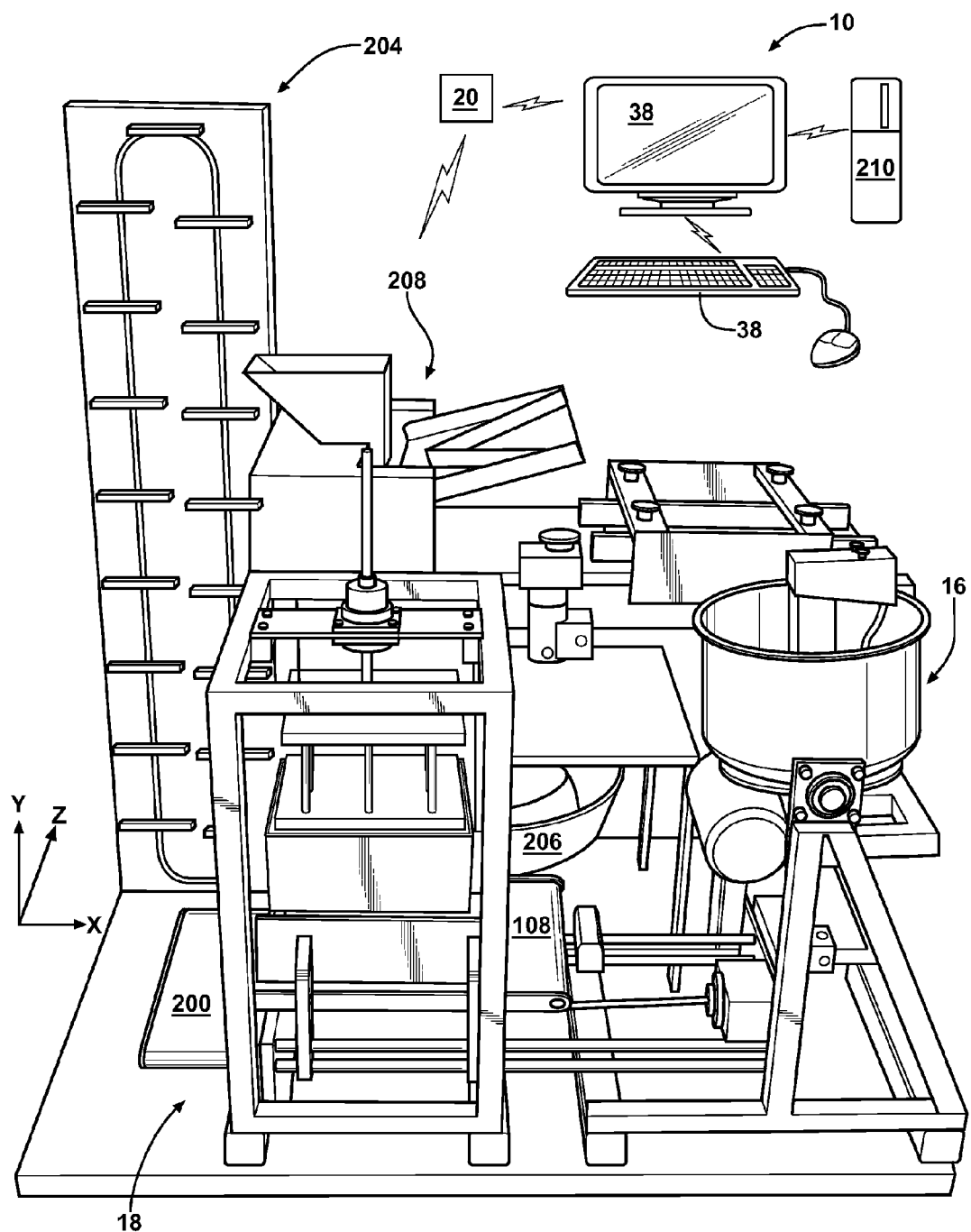
FIG. 1 is a perspective view of the dough preparing machine of the present invention.

With reference to FIG. 1, a dough preparing machine 10 for preparing dough 12 is illustrated. The dough preparing machine 10 includes a dough batching system 14 (not shown) for assembling the necessary dry ingredients, a mixing device 16 for mixing dough 12, and a dough compressing and dividing device 18. The dough preparing machine 10 is operable to mass produce dough 12 in selectable, discrete and customizable batches, wherein each batch may be a selected recipe and differing in size. The dough preparing machine 10 gathers necessary ingredients for making dough 12, mixes the dough 12 to a desired consistency, and divides the dough 12. The dough preparing machine 10 is automated and includes a controller 20, such as a programmable logic controller 20 (PLC 20) for detecting the state of dough 12 preparation so as to execute specific tasks.

The Dough Batching System

Figure 2:
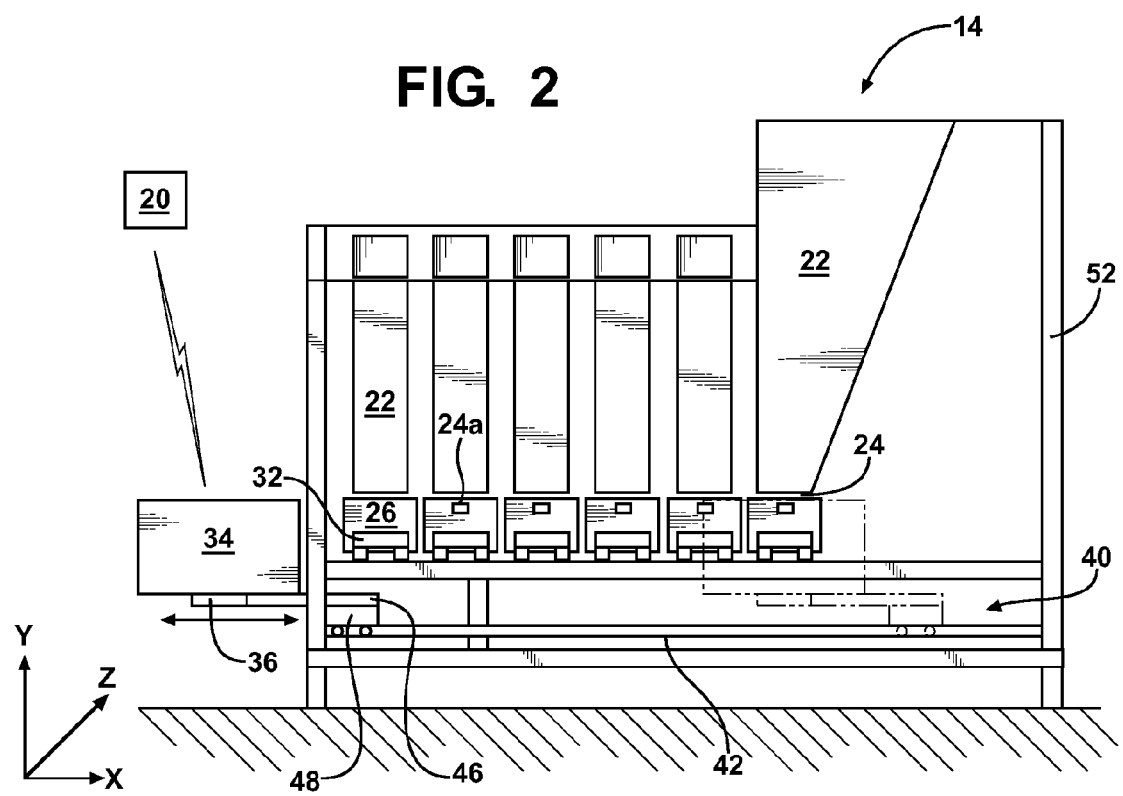
FIG. 2 is a side view of the batching system.
Figure 3:
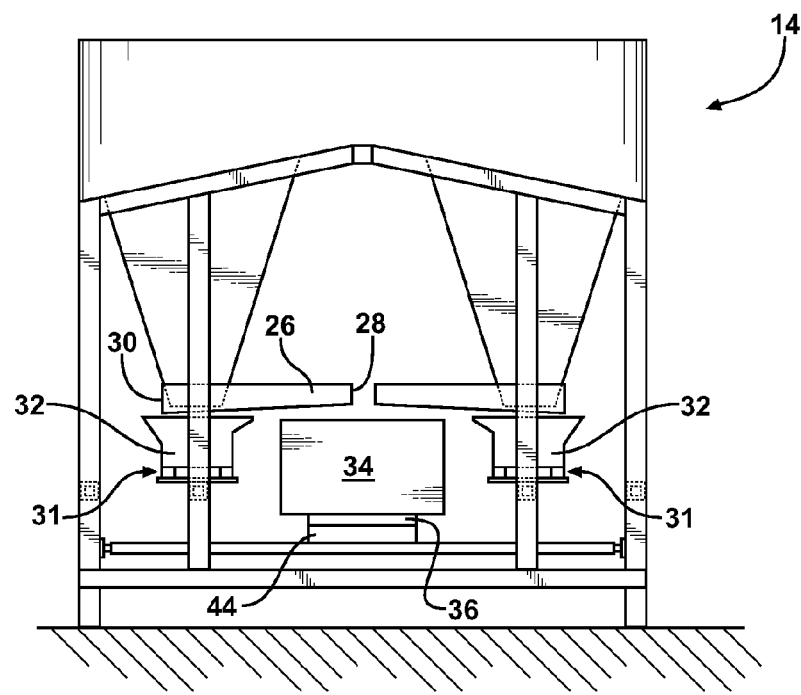
FIG. 3 is a view taken from the front of the batching system showing the batch container in position to receive ingredients from respective trays.

With reference now to FIGS. 2 and 3, a dough batching system 14 is provided. The dough batching system 14 includes a plurality of bins 22 for holding various dry ingredients necessary for making a desired dough 12 mixture. The bins 22 may be further classified into minor bins 22 and major bins 22. The minor bins 22 hold ingredients for which a relatively minor quantity is required, such as yeast, salt, and the like. The major bins 22 are larger than the minor bins 22 and hold ingredients for which a relatively large quantity is required, such as flour. Each of the bins 22 includes an opening 24. The opening 24 is disposed above a tray 26, also referred to as "automated feeders."

The opening 24 of each bin 22 is spaced a predetermined distance above the tray 26 so as to allow the contents of the bins 22 to fall onto the tray 26. It should be appreciated that the distance between the opening 24 and the tray 26 may vary depending upon the contents of the bin 22, the importance of which will be discussed. With reference again to FIG. 3, a side view of the tray 26 is provided. The tray 26 includes a mouth 28 opposite a back wall 30. The mouth 28 is operable for dispensing the contents of the tray 26. Preferably the mouth 28 is positioned above the body of the tray 26 and the bottom edge of the back wall 30. Thus, the bottom surface of the tray 26 is angled relative to the mouth 28 so that the contents of the tray 26 are not able to freely slide out the mouth 28.

The batching system 14 also includes a metering device 32 operable to deliver discrete quantities of ingredients from selected bins 22. Preferably the metering device 31 includes a vibratory device 32 and a scale 36. The vibratory device 32 is attached to each tray 26 so as to induce a predetermined frequency on the tray 26. The vibratory device 32 is in communication with the PLC 20. As the tray 26 resonates, the contents of the tray 26 are essentially vibrated, inducing the contents to move longitudinally from the back wall 30 of the tray 26 towards the mouth 28, so as to fall out of the mouth 28. Generally speaking, the vibratory device 32 is operable to move the contents upwardly towards the mouth 28.

The batching system 14 further includes a batch container 34. The batch container 34 is configured to receive the ingredients exiting from the tray 26. The scale 36 is attached to the batch container 34. The scale 36 is operable to monitor and weigh the amount of ingredients being dispensed from a particular tray 26 to ensure the proper amount of ingredients is dispensed. Any scale 36 currently known and used in the art is adaptable for use herein, illustratively including a load cell 36.

As stated above the bin openings 24 are spaced a predetermined distance from the tray 26 thereby providing ingredients on each tray 26 prior to the particular tray 26 being resonated. As each ingredient has a different material nature, it may be desirable to have certain bin openings 24 spaced further apart from the tray 26 than others. For example, a bin 22 containing sugar may have its opening 24 ¼ inch apart from the tray 26, whereas a bin 22 containing flour may have its opening 24 further than ¼ inch. It is anticipated that the bins 22 themselves may be resonated so as to ensure that the contents of the bins 22 are dispensed onto the tray 26. For example, flour tends to bridge over the bin opening 24, and in some cases the bridge prevents the flour from dispensing onto the tray 26. Resonating the bin 22 may eliminate bridging and induce free flow of the material.

Each of the vibratory devices 32 may be individually controlled and monitored by the controller 20, such as a programmable logic controller (PLC 20). The PLC 20 is in communication with the vibratory devices 32 so as to adjust the frequency induced on each of the trays 26. Adjusting the frequency of each tray 26 helps ensure that the ingredients are accurately dispensed. The PLC 20 has an interface 38 which allows a user to enter recipes. As is known, recipes will call for a specific amount of ingredients based upon the desired batch size. For example a recipe for ten pounds of white bread may require nine pounds of flour and a pound of other ingredients; while a recipe for ten pounds of wheat bread may require eight pounds of flour and two pounds of other ingredients. The contents of each bin 22 are provided to the PLC 20. The PLC 20 resonates each tray 26 containing an ingredient called for by the selected recipe. The PLC 20 may adjust the frequency so as to deliver the precise amount of ingredient. Specifically, as a tray 26 is closer to delivering the desired amount of ingredient, the PLC 20 lowers the frequency to prevent the tray 26 from dispensing too much of a particular ingredient and thus ruining the batch. Additionally, each ingredient may be quickly dispensed without sacrificing accuracy as using a high frequency will dispense the contents of a tray 26 at a greater rate than using a low frequency.

The batching system may further include a rail system 40 mounted to the housing 52. The rail system 40 includes a pair of spaced apart rails 42 extending along a first axis (denoted by "X"), and a container carriage 44 slidably mounted between the pair of rails 42. The batch container 34 is mounted to the carriage 46. The carriage 46 includes a carriage drive 48; the carriage drive 48 is in communication with the PLC 20. The PLC 20 actuates the carriage drive 48 so as to position the batch container 34 to a desired tray 26. The trays 26 are aligned along the rail 42, and the mouths 28 of the trays 26 are positioned along the path of the rail 42. A vibratory device 32 is attached to each tray 26. The bins 22 are disposed above respective trays 26. Each bin 22 contains various ingredients necessary for making a batch of dough 12.

The PLC 20 controls the movement of the batch container 34 along the rail 42, as well as the frequency of the vibratory devices 32. In operation, the PLC 20 will receive an input, i.e. the recipe, indicating the desired batch to create. The carriage 46 positions the batch container 34 along the rails 42 and under the mouth 28 of the desired tray 26. Once the batch container 34 is positioned to receive the contents of the desired tray 26, the PLC 20 then actuates the vibratory device 32 attached to the desired tray 26 to resonate the tray 26. As the tray 26 resonates, the ingredients are induced to travel from the end wall 30 and exit through the mouth 28 of the tray 26 and into the batch container 34. The scale 36 monitors the weight of the batch container 34, and communicates the weight to the PLC 20. As the desired amount of ingredients is closer to being dispensed, the PLC 20 may reduce the frequency on the tray 26 so as to ensure an accurate amount of the ingredient is administered. Once the desired amount of the ingredient is provided, the PLC 20 directs the batch container 34 to move along the rail 42 to another tray 26 to obtain another ingredient. This process is continued until all the batch ingredients have been collected.

The Dough Mixing Device

Figure 4:
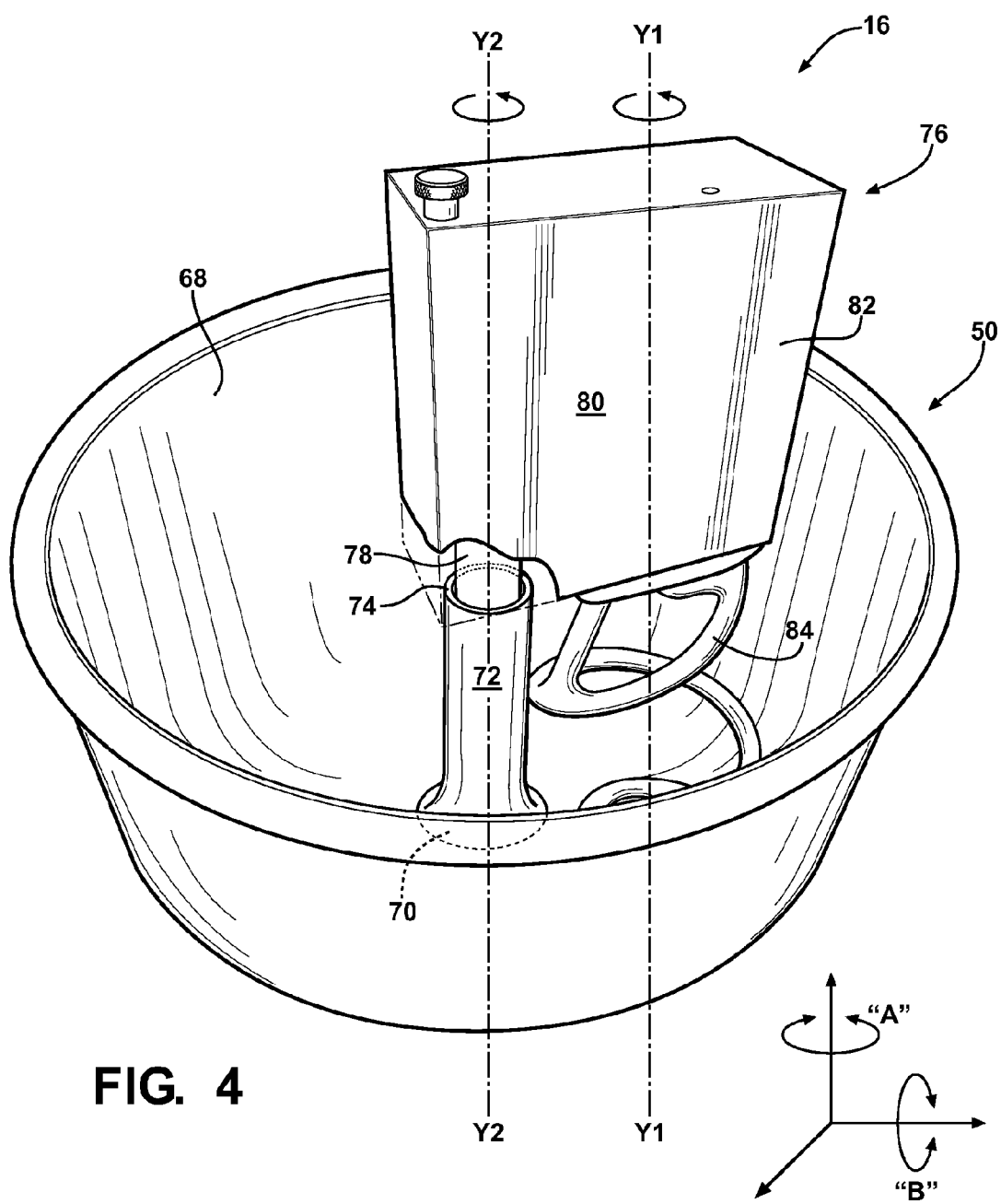
FIG. 4 is a perspective view of the bowl.
Figure 5:
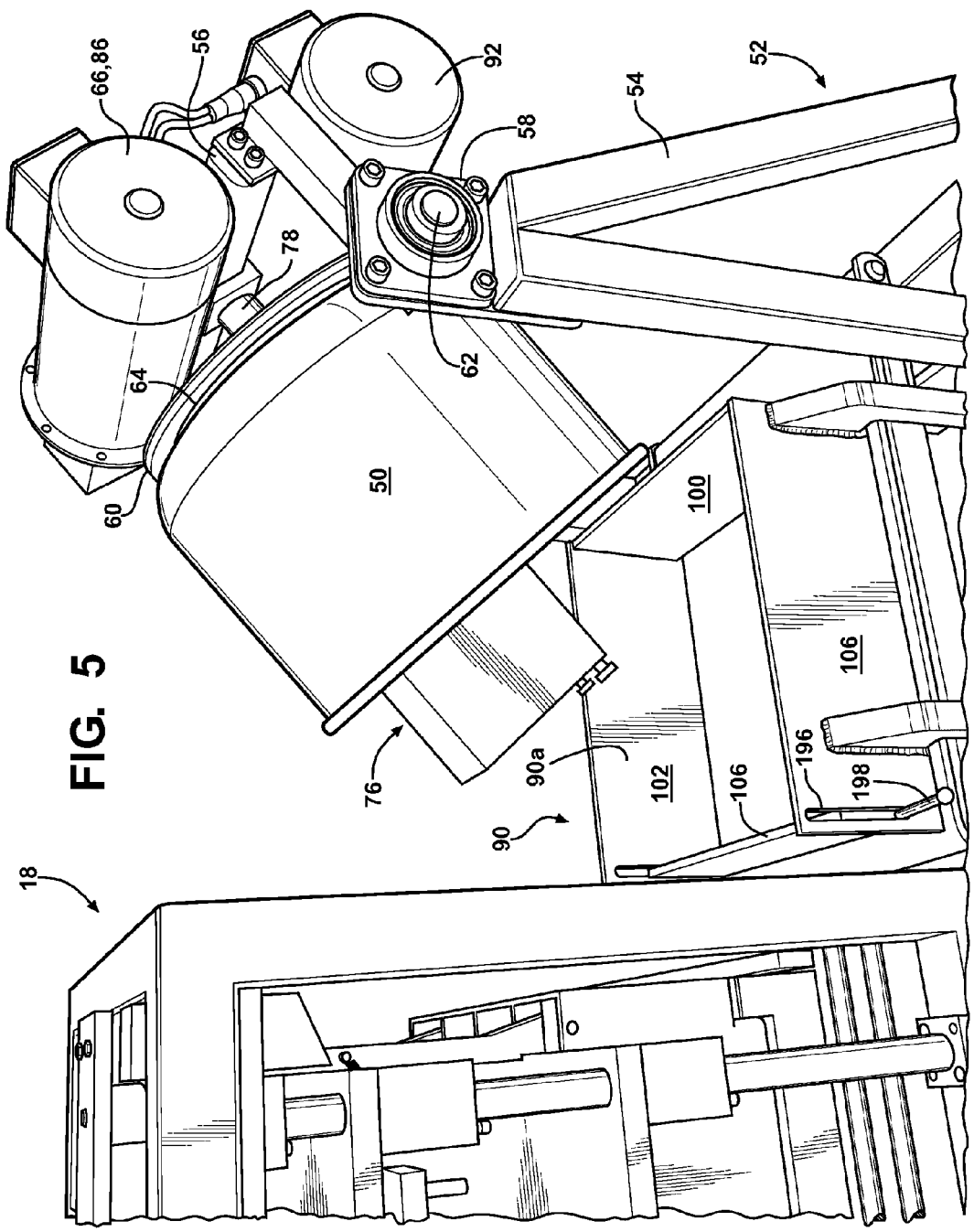
FIG. 5 is a perspective view showing the mixing device in a dumping position.

With reference now to FIGS. 4 and 5, a mixing device 16 operable to mix the batch of ingredients is provided. The mixing device 16 includes a bowl 50 supported by the housing 52. More specifically, the housing 52 includes a pair of spaced apart first support members 54 having a generally inverted v-shape, and a second support member 56 extending between the first support members 54. Preferably the housing 52 is made of a durable metal such as steel. Each first support member 54 further includes a mounting plate 58. The bowl 50 is also mounted onto a platform 60. The platform 60 is disposed between the pair of first support members 54 and includes a pair of platform arms 62 configured to engaged respective mounting plates 58. The platform arms 62 are rotatably attached to the mounting plates 58. The bowl 50 may be made from a durable material such as stainless steel or the like.

The mixing device 16 further includes a disc 64 mounted between the platform 60 and the second support member 56. The bottom of the bowl 50 is fixedly mounted to the disc 264. The disc 64 is connected to a first drive 66 operable to rotate the disc 64 so as to rotate the bowl 50. The first drive 66 is in communication with the PLC 20. The PLC 20 is operable to actuate the first drive 66. Any first drive 66 currently known and used in the art is adaptable for use herein, illustratively including a first drive 66 having a chain (not shown). In such a case, the outer peripheral edge of the disc 64 may include a plurality of teeth (not shown) evenly spaced apart from each other. The chain may be fitted around the peripheral edge of the disc 64 so as to selectively engage a predetermined number of teeth. The chain is also connected to the first drive 66, and the first drive 66 is operable to revolve the chain so as to spin the disc 64 and bowl 50 along a first plane.

The bowl 50 has an inner wall surface 68 and an aperture 70 generally disposed within the center of the bowl 50. The bowl includes an inner wall surface 72 extending upwardly from the aperture 70 so as to define an elongated chamber 72. The elongated chamber 72 includes a chamber opening 74 and is in communication with the aperture 70.

The mixing device 16 further includes a mixer 76. The mixer 76 includes mixer shaft 78 mounted to the second support member 56. The disc 64 includes an opening (not shown) in communication with the aperture 70 of the bowl 50. The mixer shaft 78 extends through the opening of the disc 64 and the aperture 70 of the bowl 50. The mixer shaft 78 may be formed a hard and durable material such as steel. A portion of the mixer shaft 78 extends through the aperture 70 and elongated chamber 72. An end portion of the mixer shaft 78 extends beyond the opening 24 of the elongated chamber 72.

The mixer shaft 78 may further include a support arm 80 extending generally acute to the end portion of the mixer shaft 78 extending beyond the elongated chamber 72. The support arm 80 includes a gear chamber 82 for gear housing a gear assembly (not shown). The mixer 76 further includes a mixer arm 84. The mixer arm 84 is disposed adjacent the free end of the support arm 80 and extends downwardly from the support arm 80 into the mixing bowl 50. The gear assembly is operative to rotate the mixer arm 84. The mixer arm 84 may be formed of a hard and durable material such as stainless steel. Any mixer arm 84 currently known and used in the art may be adaptable for use herein, illustratively including a mixer arm 84 having an elongated member with a corkscrew shape.

The first drive 66 is operable to rotate the disc 64 about the surface of the platform 60 and the mixer arm 84. In one embodiment, the gear assembly is configured to enable the first drive 66 to simultaneously rotate both the disc 64 and the mixer arm 84. It is anticipated that a second drive 86 may be provided. In such an embodiment, the second drive 86 is dedicated to the mixer arm 84 so as to independently rotate the mixer arm 84, and the first drive 66 is dedicated to the disc 64 so as to rotate the bowl 50.

As stated above, the support arm 80 is disposed on the free end of the mixer shaft 78, and the mixer arm 84 extends downwardly into the bowl 50. The mixer shaft 78 is fixed along the elongated chamber 72 of the bowl 50. Thus, the bowl 50 rotates about a first longitudinal axis (denoted by "Y1") and around the mixer arm 84. The mixer arm 84 may also be rotated, and remains rotating about a second longitudinal axis (denoted by "Y2"). The second longitudinal axis is spaced apart the first longitudinal axis. It should be appreciated that the bowl 50 and mixer 76 are rotated along a first plane (denoted by "A"). When the dough 12 has been mixed to a desired consistency, the bowl 50 may be tipped without the arm interfering with the exit of ingredients when the bowl 50 is tipped. The bowl 50 is tipped along a second plane (denoted by "B") generally orthogonal to the first plane "A". Accordingly, the bowl 50 is configured such that the mixer arm 84 extends away from where the dough 12 will exit when the bowl 50 is tipped, and mixer arm 84 does not interfere with the dough 12 exiting the bowl 50.

The mixing device 16 may be further configured so as to selectively position the mixing arm 84 in other locations within the mixing bowl 50 so as to keep the mixing arm 84 free and clear of the dough 12 during dumping operations. For instance, FIG. 5 shows the mixer arm 84 generally 180 degrees from the position along the lip of the bowl 50 where the dough would exit. However, it is anticipated that the bowl 50 may be configured such that the mixer arm is positioned 90 degrees from the position along the lip of the bowl 50 where the dough would exit. Such a configuration may be more optimal for certain dough 12.

In operation, the PLC 20 is operable to actuate the first drive 66 so as to rotate the disc 64 about the platform 60 thereby rotating the bowl 50. For illustrative purposes, assume that the disc 64 is rotating the bowl 50 in a clockwise direction. Rotation of the bowl 50 causes the dough 12 to come into contact with the mixer arm 84. The PLC 20 is further operable to actuate the mixer 76. For illustrative purposes, assume that the mixer arm 84 is rotated in a counterclockwise direction. Thus the mixer arm 84 is rotated about the first longitudinal axis "Y1", and the bowl 50 is rotated about a second longitudinal axis "Y2" which is spaced apart from the first longitudinal axis "Y1". Thus the dough 12 is placed into contact with the rotating mixer arm 84. Specifically, the mixer arm 84 remains stationary relative to the platform 60, thus the mixer arm 84 which is rotatably fixed to the support arm 80 remains at a fixed point within the rotating bowl 50. The rotation of the bowl 50 and mixer arm 84 are controlled by the PLC 20 which may vary the running length and speed of the mixing operation in view of the contents to be mixed as it may be desirable to mix one dough 12 mixture longer than another. Preferably, the disc 64 and mixer arm 84 may be rotated at different speeds.

When the contents of the bowl 50 have been thoroughly mixed the PLC 20 may stop the first drive 66 and actuate the second drive 86 so as to rotate the mixer arm 84 in a clockwise direction, thus helping to free any mixed dough 12 from the mixer arm 84 and inner surface wall 68 of the bowl 50. Additionally, the PLC 20 may actuate the first drive 66 so as to rotate the disc 64 between a clockwise and counterclockwise direction so as to perform a rocking motion similar to a washing machine. Furthermore, the PLC 20 may also actuate the mixer arm 84 between a clockwise and counterclockwise direction so as to perform a rocking motion similar to a washing machine. Such an action may help disengage the dough 12 from the mixer arm 84 and inner wall surface 68 of the bowl 50 to facilitate dispensing the dough 12. This process may be continued over a predetermined amount of time and at varying speeds to help remove the dough 12 from the inner wall surface 68 of the bowl 50. Reversing the direction of the mixer 76 hook helps free the hook of dough 12 and ensures that all of the mixed dough 12 is used to make bread, thus decreasing waste and ensuring a consistent weight of the finished product. The above dough dumping processes are provided for illustrative purposes, and it is anticipated that the PLC 20 may be programmed with various algorithms for dumping the dough 12 depending on the type of dough 12 being mixed.

Figure 6:
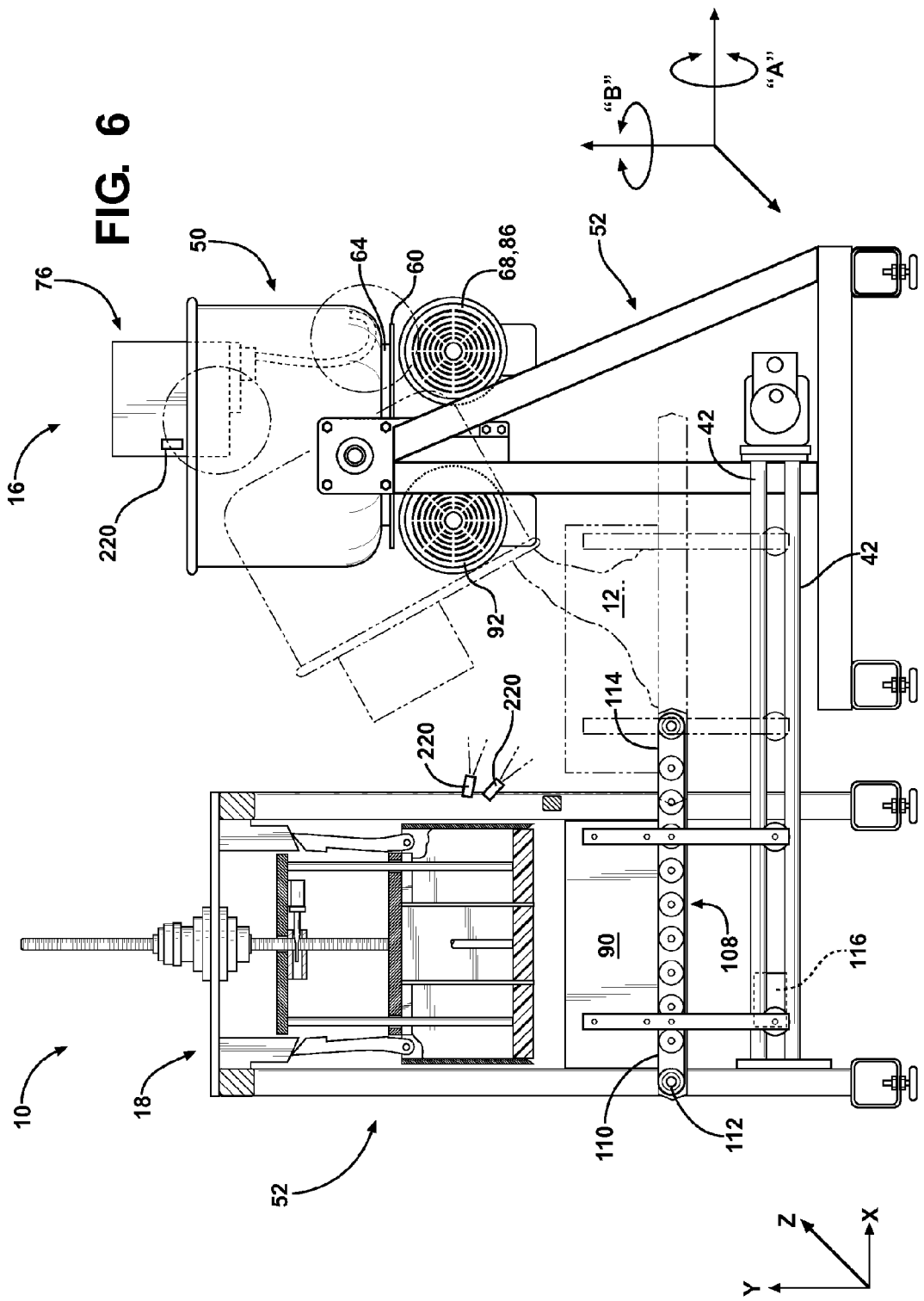
FIG. 6 is a perspective view of a dough processing system showing the mixing device in a substantially upright position, and in the dumping position.

With reference now to FIG. 6, the mixing bowl 50 is shown tipped so as to pour the contents of the bowl 50 into the dividing container 90. The mixing bowl 50 further includes a tipping drive 92. The tipping drive 92 is in communication with the platform 60 and is operable to rotate the platform 60 about the mounting plates 58 of the housing 52 so as to dump the dough 12 into the dividing container 90. As shown in FIG. 6, the mixer arm 84 is configured opposite the point where mixed dough 12 exits the bowl 50 thus ensuring that the mixer arm 84 does not obstruct the exit of dough 12. The mixing device 16 eliminates the need for manually or automatically adjusting the position of the mixer arm 84 with respect to the bowl 50 prior to dumping the ingredients into the dividing container 90.

The Compressing and Dividing Device

With reference now to FIGS. 7-14, a compressing and dividing device 18 is provided. The compressing and dividing device 18 includes a dividing container 90. With reference specifically to FIG. 7a, an illustrative view of the dividing container 90 is provided. The dividing container 90 may be shaped in any dimension. For instance it could be round, or it could be square. For illustrative purposes the dividing container 90 is shown as being rectangular. The dividing container 90 is defined by a wall 88 enclosing a space. The wall has a movable wall 106 that is displaceable with respect to the wall 88 so as to provide an opening, the relevance of which will be discussed later. Specifically, the dividing container 90 includes an end wall 100 and a pair of sidewalls 102 extending from respective ends of the end wall 100. The sidewalls 102 are spaced apart from each other and each extend to a terminal free end 104. The dividing container 90 further includes a movable wall 106. The movable wall 106 is disposed between the terminal free ends 104 of each sidewall 102, and is operable to displace so as to provide an opening for which the divided dough 12 may be transported for further processing.

With reference again to FIG. 6, an illustrative view of the housing 52 is provided. The housing 52 may further include a first conveyor 108. The dividing container 90 is fixedly mounted above the first conveyor 108. The first conveyor 108 includes a belt 110 and a belt drive 112 operable to rotate the belt 110. The belt 110 includes a belt surface 114 for supporting the mixed dough 12. The first conveyor 108 is mounted along a pair of spaced apart rails 42. The housing 52 further includes a conveyor drive 116 operable to shuttle the conveyor axially along the rails 42 between a receiving position (indicated by the dashed lines) and a dividing position (indicated by the solid lines). In the receiving position, the conveyor is position so as to place the dividing container 90 in a position to receive the mixed dough 12 from the mixing bowl 50. In the dividing position, the conveyor is moved away the receiving position so as to position the mixed dough 12 for compressing and dividing operations.

The first conveyor 108 may further include a support plate 118, as shown in FIGS. 8-13 and 16. The support plate 118 is made of a durable material such as steel so as to provide a sufficiently rigid surface and has a generally planar surface to support dividing operations. The support plate 118 is fixedly mounted between the rails 42 and is disposed underneath the belt 110 and the dividing container 90. More specifically, the support plate 118 is disposed between the upper and lower belt surfaces 114. The plate provides a rigid surface to help to facilitate the division of dough 12.

In another embodiment of the support plate 118, the support plate includes a portion 118a configured to fittingly receive a support pad 118b. The support pad 118b has a first support surface that is generally planar and aligned with the surface of the support plate so as to present a generally planar surface. The portion 118a of the support plate 118 may be milled out so as to fittingly hold the support pad 118b. Preferably, the support pad 118b is made of a resilient polymer such as plastic having elastic properties so as to give way to better divide the dough, as will be explained in greater detail below.

With reference now to FIGS. 8-13, an illustration of compressing and dividing operations is provided. The compressing and dividing device 18 is operable to compress and divide the dough 12 into individual loaves. The compressing and dividing device 18 includes a first plate 120 spaced a predetermined distance apart from a second plate 122 both movable between a ready position and cutting position by a drive shaft 124. The first and second plates 120, 122 are formed from a durable material such as steel and are mounted within the housing 52 so as to be displaced above the first conveyor 108. The drive shaft 124 is operable to actuate the first and second plates 120, 122 to perform compressing and dividing operations. The first plate 120 is configured to compress the dough 12 and the second plate 122 is configured to divide the dough 12.

Figure 8:
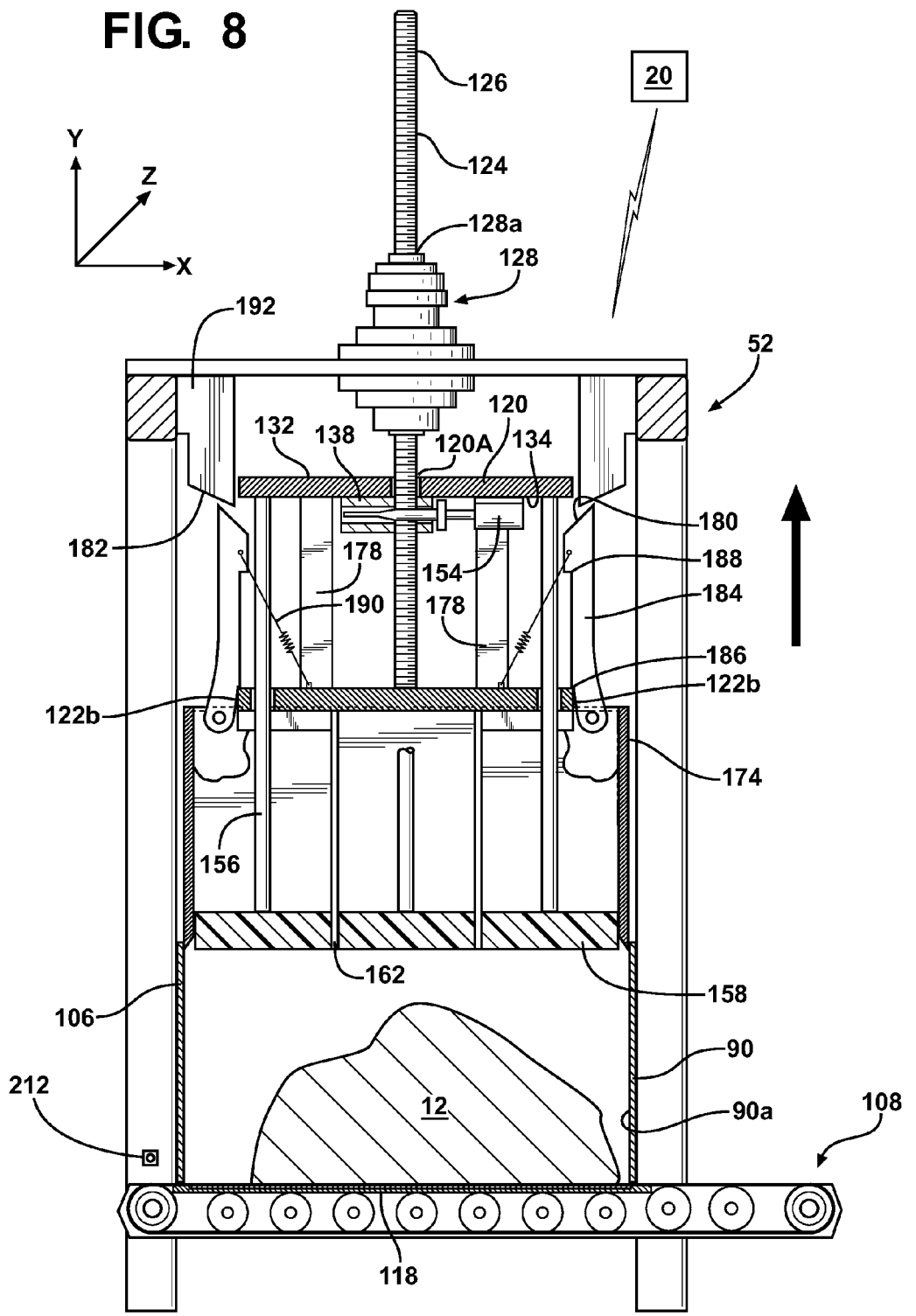
FIG. 8 is a cross-sectional view of the dividing and compressing system in the ready position.

As will be explained in greater detail below, the first and second plates 120, 122 operate in a cycle. At the beginning of the cycle, the first and second plates 120, 122 are in a ready position, as shown in FIG. 8. In the ready position, the first and second plates 120, 122 remain in a fixed spatial relationship along the drive shaft 124 with respect to each other. During the cycle of operation, the first and second plates 120, 122 are displaced with respect to each other. Specifically, the first plate 120 is released from the drive shaft 124 and the drive shaft 124 is operable to displace the second plate 122 with respect to the first plate 120. The first plate 120 and second plate 122 are selectively released from a fixed relationship with each other to perform compressing and cutting operations. Furthermore, operating the compressing and dividing device 18 in a cycle facilitates the automation and efficiency of dough 12 manufacturing.

The drive shaft 124 is mounted to the housing 52. The drive shaft 124 is movable along a drive axis (denoted by "Y") that is generally oriented along a vertical plane. An outer portion of the first drive 66 shaft is threaded 126. The drive shaft 124 is in communication with the PLC 20. The PLC 20 is operable to rotate the drive shaft 124 clockwise and counterclockwise. The drive shaft 124 is supported by a drive shaft support 128. The drive shaft support 128 is fixedly mounted to the housing 52 and disposed over the first conveyor 108. The drive shaft support 128 is further operable to translate the rotation of the drive shaft 124 into displacement of the drive shaft 124 along the drive axis "Y". Any drive shaft support 128 currently known and used in the art is adaptable for use herein illustratively including a drive shaft support 128 having a drive chain (not shown) operable to rotate the gear in either a clockwise or counterclockwise position. The drive shaft support 128 includes a bore 128a configured to engage the drive shaft 124, the bore 128 may be threaded such that clockwise rotation of the drive shaft support 128 causes the drive shaft 124 to be displaced closer towards the conveyor, whereas counterclockwise rotation of the drive shaft support 128 cause the drive shaft 124 to be displaced away from the first conveyor 108.

The first plate 120 includes a first plate surface 132 opposite a second plate surface 134 and a bore 120a extending between the first and second plate surfaces 132, 134 of the first plate 120. The second plate surface 134 faces the conveyor belt 110. The bore 120a is configured to receive a portion of the drive shaft 124, and the drive shaft 124 extends through the bore 120a. The first plate 120 includes a coupling device 138 operable to releasably engage the first plate 120 with the drive shaft 124. Specifically, the coupling device 138 is operable to fix the first plate 120 a predetermined distance above the second plate 122. The coupling device 138 is attached to the outer surface of the first plate 120. Though the figures show the coupling device 138 mounted to the second plate surface 134 of the first plate 120, it is anticipated that the coupling device 138 may be mounted to the first plate surface 132 of the first plate 120.

Figure 14:
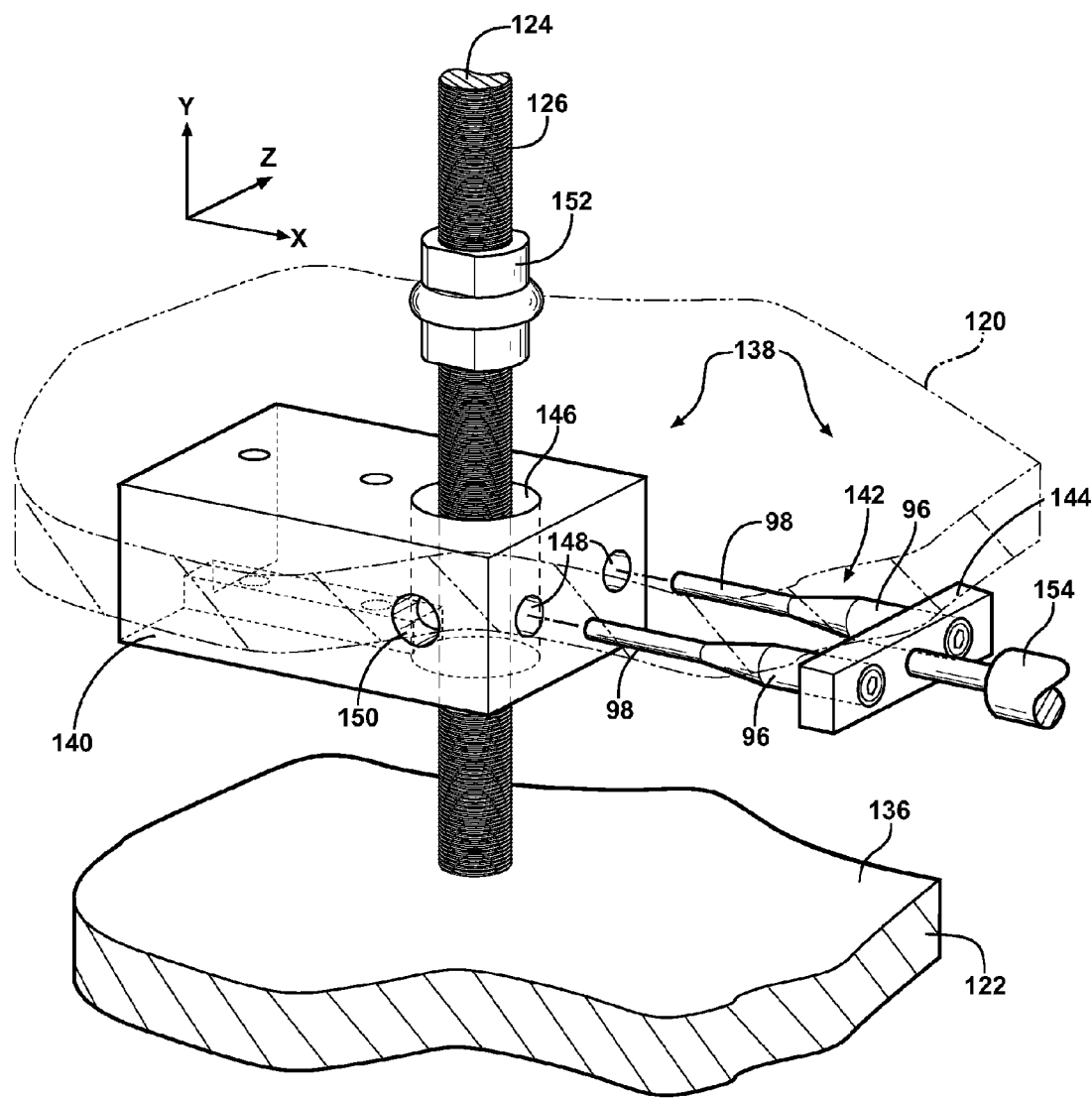
FIG. 14 is an isolated view of the coupling device, the drive shaft, and the retainer.

With reference now to FIG. 14, an illustrative view of the preferred embodiment of the coupling device 138 is provided. The coupling device 138 includes a collar 140, and is in communication with the PLC 20. The collar 140 has an elongated body member and a pair of engaging arms 142 mounted on a support member 144. The elongated body member includes a first passageway 146 configured to receive the drive shaft 124, and a pair of side passageways 148 extending along the first axis "X", and orthogonal to the drive axis "Y". Each side passageway 148 includes a side opening 150 in communication with the first passageway 146. The side openings 150 are spaced apart and opposite each other and extend along axis "Z". Each engaging arm 142 is slidably disposed within respective side passageways 148. The engaging arms 142 are generally cylindrical and formed of a durable material such as steel. The engaging arms 142 are tapered and include a first portion 96 and a second portion 98. The first portion 96 is attached to the support member 144 and has a radius greater than that of the second portion 98. The coupling device 138 further includes at least one retainer 152 fixedly secured to the drive shaft 124. Preferably the retainers 152 are formed from the same material as the engaging arms 142.

The coupling device 138 further includes a coupling device drive 154 operable to move the engaging arms 142 between an engaged and a release position. Preferably, the coupling device drive 154 is a servo motor in communication with the PLC 20. In the engaged position, the coupling device drive 154 is operable to push the support member 144 flush against an end wall of the elongated body member, wherein the first portion 96 of each of the engaging arms 142 are in communication with the first passageway 146, and wherein a portion of the first portion 96 of each of the engaging arms 142 extend outwardly from respective side openings 150 of the side passageways 148.

In the release position, the coupling device drive 154 is operable to move the support member 144 away from the end wall of the elongated body member so as to position the second portion 98 of each of the engaging arms 142 within respective side openings 150 of the side passageways 148. In the release position, the first passageway 146 is free of the engaging arms 142. Thus, when the engaging arms 142 are in the engaged position, the first portion 96 of the engaging arms 142 extends into the first passageway 146 and engages the retainer 152 so as to fix the first plate 120 with respect to the drive shaft 124. As such, the drive shaft 124 is operable to displace the first plate 120 along the drive axis. Conversely, when the elongated body member is in the second position, the second portions 98 of the arm are disposed in the opening 24, and the first passageway 146 is clear of the engaging arms 142. Thus, the retainers 152 are free of engagement and the first plate 120 is disengaged form the drive shaft 124. Displacement of the drive shaft 124 along the drive axis does not move the first plate 120 when the first plate 120 is disengaged from the drive shaft 124.

Figure 15:
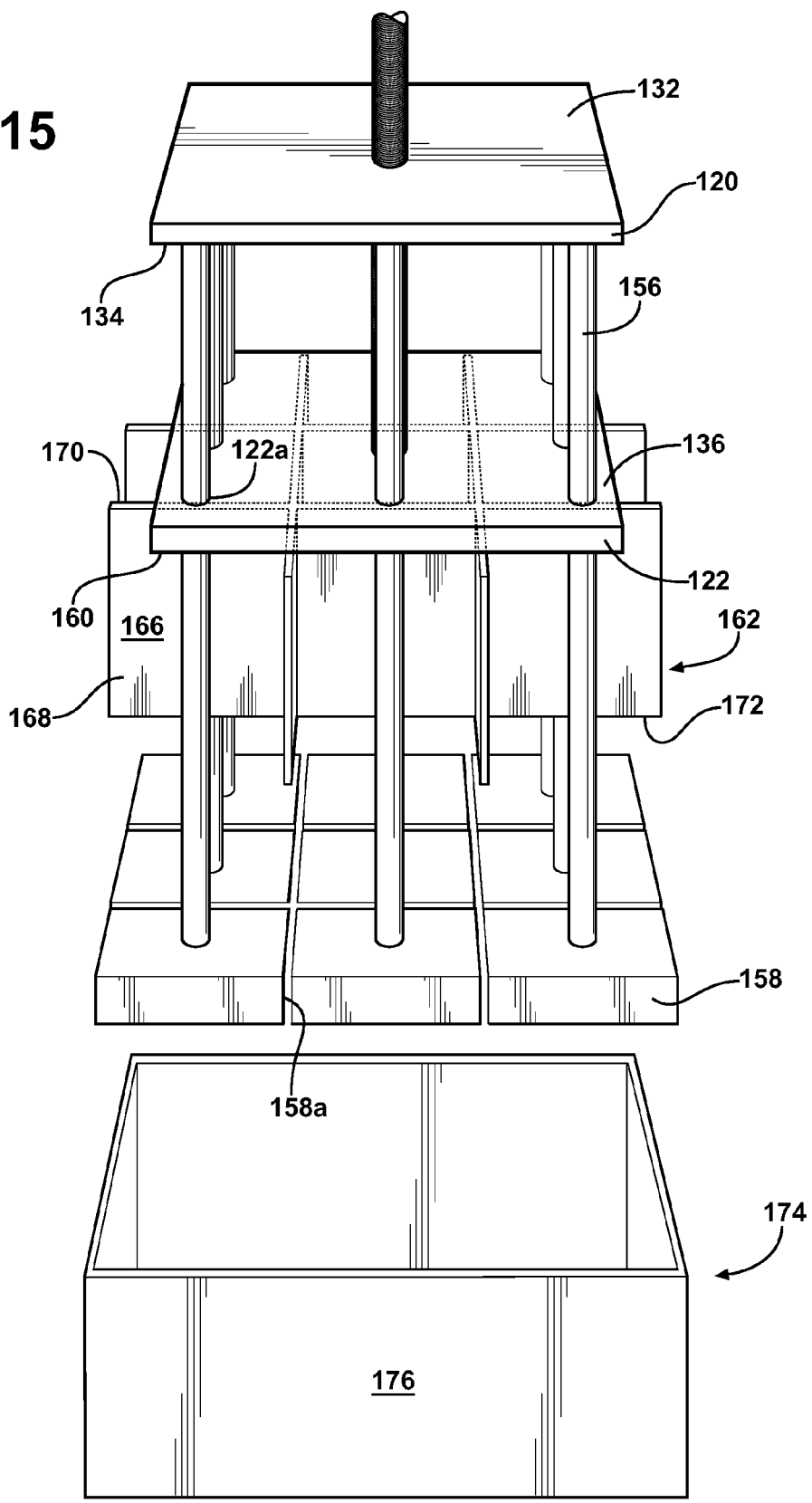
FIG. 15 is an isolated view of the first and second plates.
Figure 16:
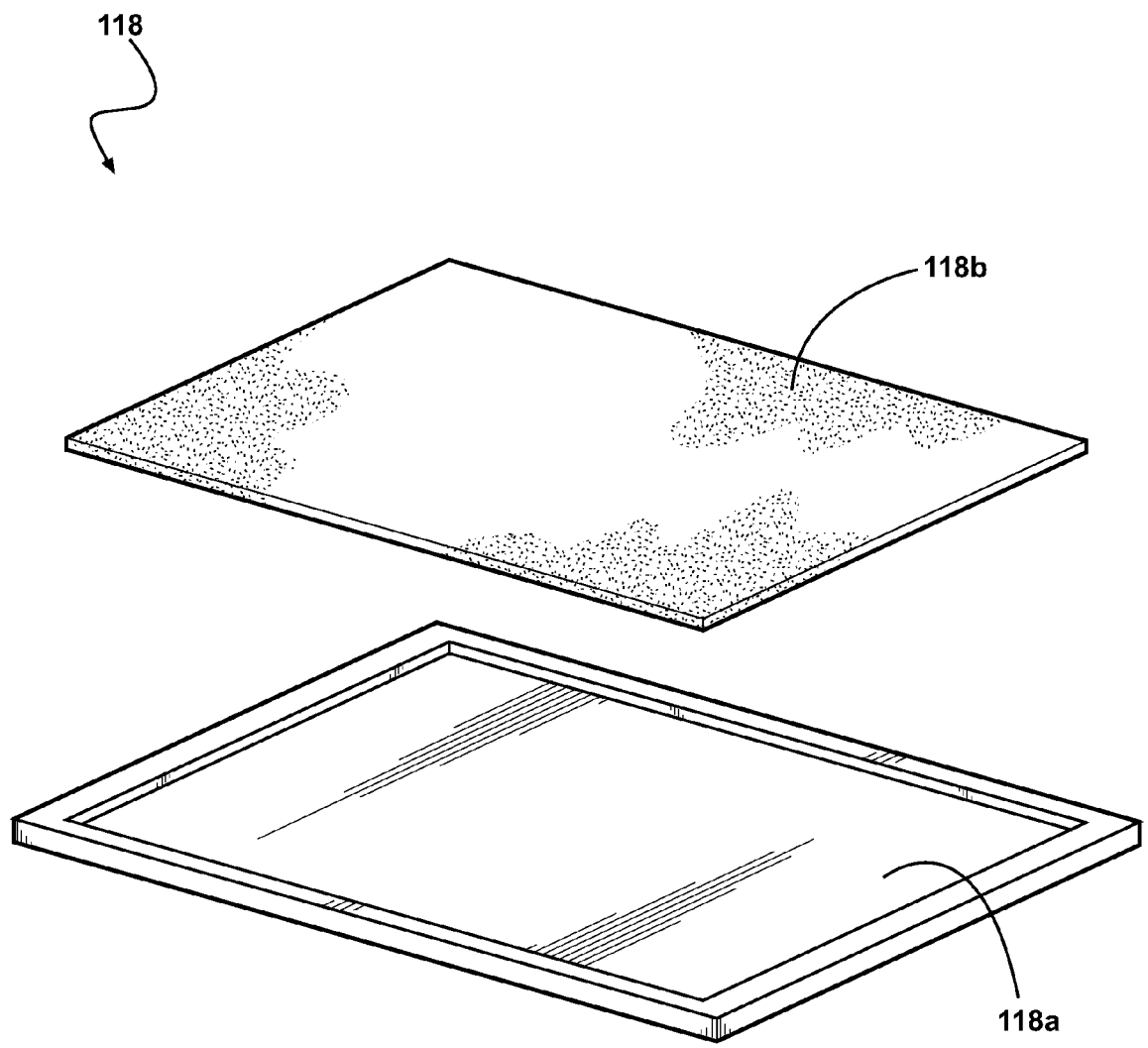
FIG. 16 is an isolated view of the support plate showing the support pad.

With reference now to FIG. 15, the first plate 120 further includes a plurality of elongated block supports 156, and a corresponding plurality of blocks 158. The blocks 158 are attached to the ends of the elongated block supports 156. The blocks 158 are configured to present a planar surface for compressing the mixed dough 12. The sidewalls 158a of each of the blocks 158 are evenly spaced a predetermined distance apart from opposing sidewalls 158a. The blocks 158 may be formed of a durable material such as hardened polypropylene, plastic, or the like. The planar surface of the blocks 158 may be coated so as to prevent the blocks 158 from sticking to the dough 12 (not shown).

With reference again to FIG. 15, an illustrative view of the second plate 122 is provided. The second plate 122 is fixedly attached to the drive shaft 124 and is closer to the conveyor than the first plate 120. The second plate 122 has a first surface 136 opposite a second surface 160. The second surface 160 faces the conveyor belt 110 (not shown). The second plate 122 includes a plurality of bores 122a configured to receive respective elongated block supports 156. A plurality of blades 162 is fixedly attached to the second surface 160 of the second plate 122. The blades 162 have a terminal free edge 172, also referred to herein as the blade edges. The blade edges 172 define the cutting edge of the blades 162. The plurality of blades 162 are configured to fit within the spaces between each of the blocks 158. The plurality of blades 162 includes a plurality of panels 166 having a first panel surface 168 opposite a second panel surface 170. The panels 166 are made of durable material having sufficient rigidity to cut through the dough 12 such as steel, plastic, a hardened polymer of the like. The panels 166 are generally orthogonal to each other so as to form a lattice structure configured to fit within the spaces of the matrix of blocks 158. Each of the panels 166 has a predetermined thickness so as to be fittingly received between the spaces formed between the blocks 158. More specifically, the first and second panel surfaces 168, 170 are configured to be in contact with respective sidewalls 102 of the blocks 158.

The blade edges 172 of the configuration of blades 162 have a generally planar surface. The blade edges 172 extend away from the second plate 122 a predetermined distance. The elongated block supports 156 are configured to extend respective blocks 158 away from the upper support such that when the first plate 120 is fixed to the drive shaft 124, the planar surface of the blade edges 172 are aligned with the planar surface of the configuration of blocks 158 so as to form a uniform planar surface for compressing the dough 12. Thus, in the fixed position, actuation of the drive shaft 124 moves the first and second plates 120, 122 together. Additionally, when the first and second plates 120, 122 are in the fixed position, the panels 166 are disposed between the blocks 158 and a planar surface is formed. Accordingly, the first and second plates 120, 122 may be forced downwardly so as to present a generally uniform planar surface to facilitate the uniform compression of dough 12.

Figure 12:
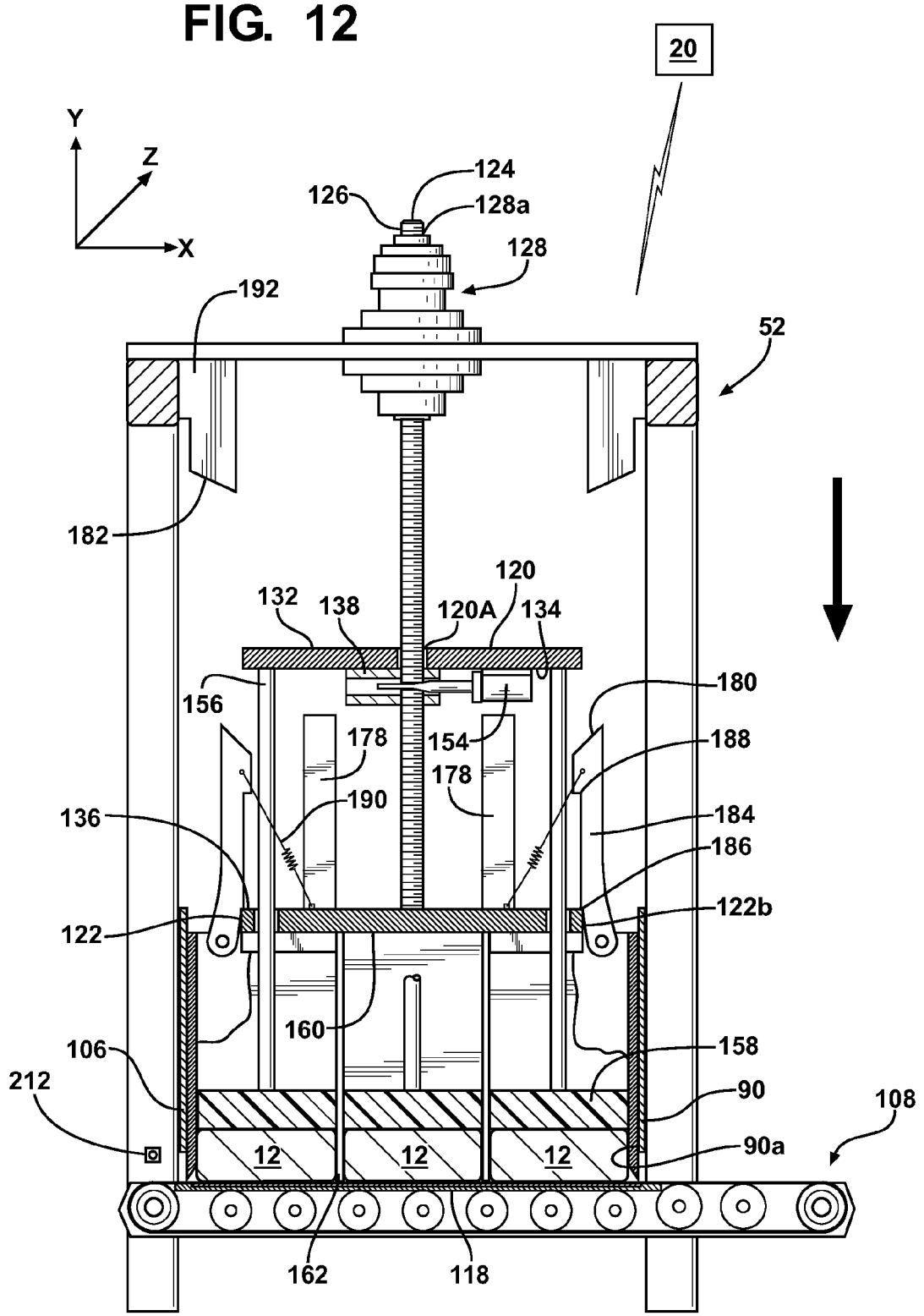
FIG. 12 is a view of FIG. 11, showing the second plate engaging the dough for dividing operations.
Figure 13:
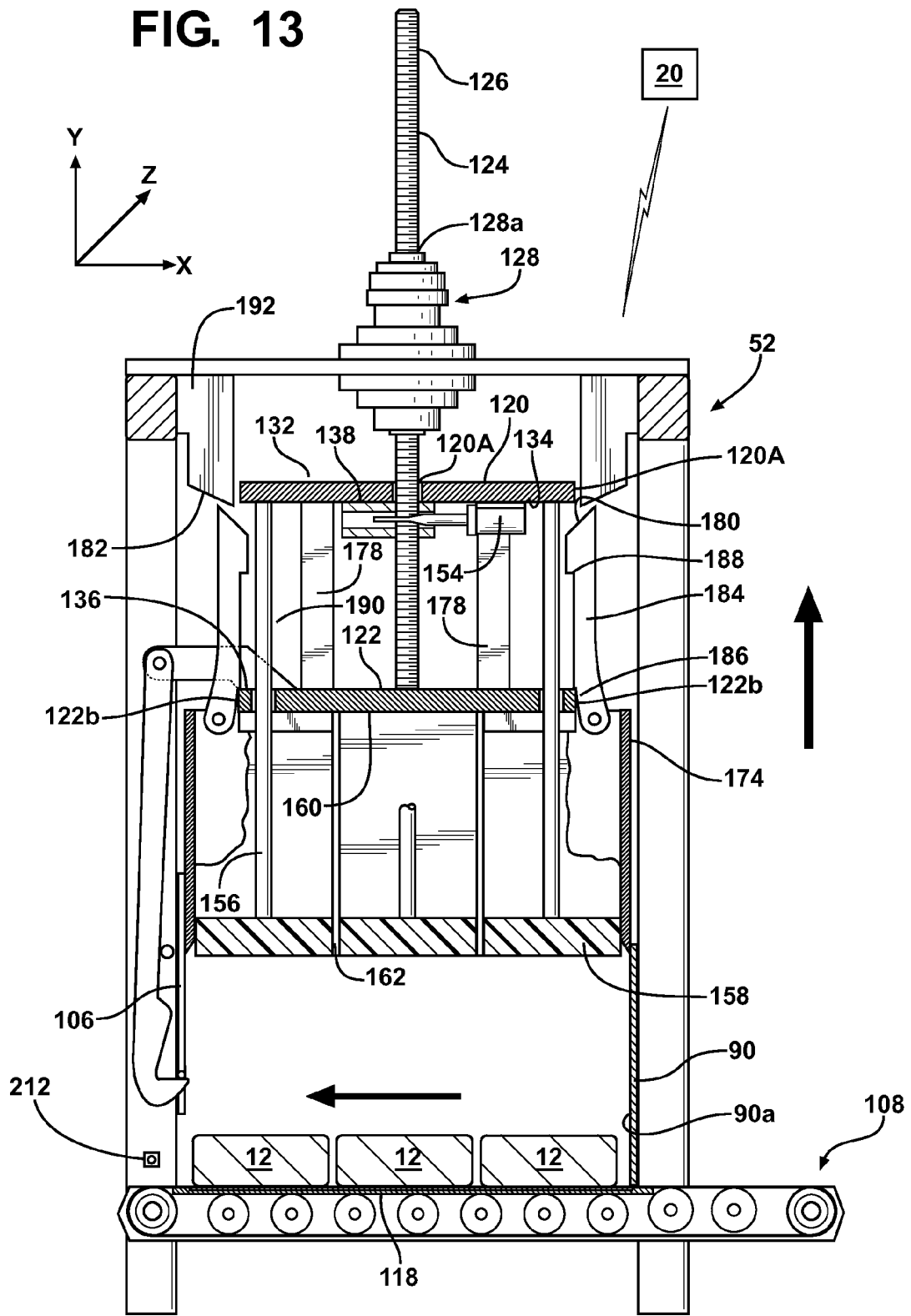
FIG. 13 is a view of FIG. 12, showing the movable wall displaced and the spacers engaged with the first plate.

During dividing operations, the first plate 122 is released from the drive shaft 124, and thus advancement of the drive shaft 124 towards the conveyor 108 only advances the second plate 120. The blades 162 are pushed through the mass of dough 12 and engage the support plate 118, as shown in FIG. 12. When the support plate 118 is configured with the support pad 118b, the support pad absorbs some of the lateral displacement of the blades 162. The blade edges 172 may become relatively uneven with respect to each other as a result of operating loads or manufacturing tolerances. Accordingly, the support pad 118b is compressed during dividing operations by uneven blades 162 so as to ensure that a blade edge 172 which may be uneven will still divide the dough. For example, if one end of a blade 162 is 0.25 inches further away from the second plate 122 than the other end of the same blade 162, then a portion of one block of dough 12 will still be attached to a neighboring block if the support plate 118 is rigid. However, having a resilient support pad 118b allows for some displacement such that the further end of the blade 162 is able to advance until the closer end of the blade 162 engages the support pad 118b, and thus completely dividing the dough 12.

The compressing and dividing device 18 further includes an inner housing 174. The inner housing 174 is releasably attached to the second plate 122. The inner housing 174 is operable to disengage from the second plate 122 and drop into the dividing container 90. Preferably, the inner housing 174 is made of a slick material that prevents the mixed dough 12 from sticking to the wall 88 of the dividing container 90, such as a polymer or a treated metal.

The inner housing 174 is configured to engage the inner wall surfaces 90a of the dividing container 90. The inner housing 174 includes an inner housing wall 176 having a predetermined thickness. The inner housing 174 serves two purposes. One purpose is to prevent the dough 12 from sticking to the inner wall surface 68 of the dividing container 90 during compressing operations. The other purpose of the inner housing 174 is to act as a spacer 178. Specifically, the predetermined thickness of the inner housing wall 176 leaves a gap between the outer surfaces of the compressed and divided dough 12 and the inner wall surfaces 90a of the dividing container 90. As is known in the art, dough 12 having yeast will rise, i.e. expand. Thus, the gap provides time for the dough 12 to expand before sticking to the inner wall surfaces 90a of the dividing container 90.

In a first preferred embodiment, the inner housing 174 includes a pair of inner housing arms 184 disposed on opposite sides of the inner housing 174. The end of each inner housing arm 184 is pivotably attached to opposing walls 176 of the inner housing 174. Each inner housing arm 184 includes an elongated shaft having a first notch 186 spaced apart from a second notch 188. The free end of each inner housing arm 184 has a cam surface 180 that is angled relative to the longitudinal length of the inner housing arms 184. The inner housing arms 184 may be made of a durable material such as steel or a hardened polymer such as plastic.

The inner housing 174 further includes a biasing member 190 operable to urge the inner housing arms 184 to engage the side edges 122b of the second plate 122. The biasing member 190 may be a spring 190. One end of the spring 190 is attached to the first surface 136 of the second plate 122, and the other end of the spring 190 is attached to the free end of the inner housing arm 184. The biasing member 190 is operable to urge the inner housing arm 184 against the side edges 122b of the second plate 122.

The housing 52 includes a pair of actuating members 192. Each actuating member 192 includes a ramped shaped surface 182 and is fixedly attached to opposing portions 94, 96, 98 of the housing 52. The ramped shaped surfaces 182 are operable to engage respective cam surfaces 180 of the inner housing arms 184. Specifically, in one phase of the dividing and compressing operations, the first notch 186 of each inner housing arm 184 is engaged with respective side edges 122b of the second plate 122. The biasing member 190 urges the inner housing arms 184 to further engage the side edges 122b of the second plate 122. The drive shaft 124 is operable to move the first and second plates 120, 122 together away from the conveyor belt 110 and towards the actuating member 192.

In the ready position, the ramped shaped surface 182 of the actuating members 192 are spaced a predetermined distance from the cam surface 180 of the inner housing arm 184. During operation, the cam surfaces 180 are placed into contact with respective ramped shaped surfaces 182. Accordingly, the ramped shaped surfaces 182 actuate the inner housing arms 184 so as to pivot the inner housing arms 184 away from respective side edges 122b of the second plate 122 and disengage the first notches 186 of each inner housing arm 184 away from the second plate 122. When the inner housing arms 184 are disengaged from the second plate 122, the inner housing 174 drops such that the outer wall 88 surface of the inner housing 174 is in sliding engagement with the inner wall surface 90a of the dividing container 90.

In another embodiment, the inner housing 174 is releasably mounted to the second plate 122 and encloses the configuration of blades 162. Initially, both the first and second plate 120, 122 are moved from the ready position to the engaging position, where the configuration of blocks 158 and blades 162 present a planar surface for compressing the dough 12. Once a predetermined pressure is detected, the PLC 20 releases the collar 140, thus releasing the first plate 120 from the drive shaft 124, and the drive shaft 124 is operable to drive the second plate 122 further downward. As the first plate 120 is released from the first drive 66 shaft, only the second plate 122 is driven downwardly into the compressed dough 12. Thus, the inner housing 174 slidingly engages the inner surface wall 90a of the dividing container 90, while simultaneously the configuration of blades 162 cut through the compressed dough 12 so as to form individual loaves. The PLC 20 will then actuate the first drive 66 upwardly into the ready position for the next step of the operation.

As stated above the movable wall 106 is operable to be displaced so as to provide an opening for the transfer of dough 12. With reference again to FIGS. 7a and 7b, a first preferred embodiment of the movable wall 106 is provided. In the first preferred embodiment, the compressing and dividing device 18 further includes a catch 194, the catch 194 is operable to engage the movable wall 106 of the dividing container 90. The catch 194 is mounted to the second plate 122 and extends between opposing side edges 122b of the second plate 122. Each sidewall 102 of the dividing container 90 may further include a vertically oriented slot 196. The movable wall 106 is disposed between the terminal free ends 104 of each sidewall 102, and may further include a pair of retaining arms 198 extending from opposing ends of the movable wall 106. The retaining arms 198 are configured to engage the respective vertical slots 196 of the sidewalls 102. As the second plate 122 is lowered, the catch 194 engages respective retaining arms 198 of the movable wall 106. When the second plate 122 is lifted, the catch 194 in turn lifts the movable wall 106 so as to provide an opening 24 for transfer of the dough 12. As the retaining arms 198 come into contact with the upper portion of respective slots 196, the catch 194 is pivoted so as to release the movable wall 106. More specifically, the catch 194 includes an operative surface 194a. The operative surface is angled relative to a side edge of the catch 194. As the second plate 122 is lifted, the operative surface 194a comes into contact with a pin 52a attached to the housing 52. The pin 52a displaces the catch 194 away from the retaining arms 198 so as to release the retaining arms 198 and drop the movable wall 106.

The movable wall 106 is lifted from the conveyor so as to provide clearance for the divided dough 12, and the PLC 20 actuates the belt drive 112 so as to advance the divided dough 12 through the opening 24 for further processing. The dough 12 has been divided so as to form individual rows of dough 12. The belt drive 112 is indexed and the conveyor advances individual rows of dough 12 to a second conveyor 200, as shown in FIG. 1. The second conveyor 200 is shown being generally orthogonal to the first conveyor 108, extending along axis "Z". This configuration helps minimize the space of the machine 10, however, it is anticipated that that the second conveyor 200 may extend along the same axis of the first conveyor 108. The second conveyor 200 is operable to transport the individual loaves of dough 12 for further processing.

With reference again to FIGS. 7a and 7b, a second embodiment of the movable wall 106 is provided. In this embodiment, a servo motor 202 is operable to move the second plate 122 from the sidewall 102 so as to form an opening 24. The servo motor 202 is attached to the sidewall 102 of the dividing container 90. The servo motor 202 is in communication with the PLC 20 and is operable to displace the movable wall 106 so as to form an opening 24. For instance, the servo motor 202 may move respective retaining arms 198 up along the slot 196 and away from the belt 110. In another embodiment, the retaining arms 198 are pivotably attached to respective ends of each sidewall 102, and the servo motor 202 is operable to rotate the movable wall 106 so as to form the opening.

The compressing and dividing device 18 further includes a spacer 178. The spacer 178 is an elongated member one end of the spacer 178 is attached to the first surface 136 of the second plate 122. The free end of the spacer 178 is a predetermined distance apart from the first plate surface 132 of the second plate 122. The spacer 178 helps the second plate 122 and first plate 120 maintain a predetermined distance apart from each other during compressing operations. Additionally, the free end of the spacer 178 engages the first plate 120 and aligns the bore 120a of the first plate 120 with the retainer 152 so as to facilitate the engagement of the coupling device 138 to the retainer 152 and fix the first plate 120 with respect to the drive shaft 124. The compressing and dividing device 18 may include a plurality of spacers 178 positioned along selected portions of the first surface 136 of the second plate 122 so as to help maintain the first plate 120 along a horizontal plane.

The Dough Preparing Machine

The dough preparing machine 10 is operable to gather ingredients for the dough 12, mix the ingredients together, compress the dough 12, and cut the dough 12 into individual loaves. The machine 10 may include a rest conveyor 204, a rounder 206, and a sheeter 208. The machine 10 is in communication with a PLC 20. The PLC 20 is operable to monitor the system and actuate the system to perform a programmed task.

The PLC 20 may include an interface 38, and is in communication with a database 210. The database 210 may have a list of various recipes for dough 12. The recipes include the necessary ingredients, as well as the steps required to make the dough 12, such as the consistency of the dough 12, the desired room temperature, and humidity the dough 12 should be prepared in, and the like. The interface 38 is operable to input a recipe and select any one of the recipes in the database 206.

The PLC 20 communicates the selected recipe to the batching system 14. The PLC 20 actuates carriage drive 48 so as to position the batch container 34 along the rail system 40 to receive ingredients. The batch container 34 is positioned at the mouths 28 of each tray 26 containing ingredients used in the selected recipe. A position sensor 24a may be provided to ensure that the batch container 34 is in a position for receiving the ingredients. Any position sensor 24a currently known and used in the art is adaptable for use herein, illustratively including a laser. The position sensor 24a sends a signal to the PLC 20 when the position sensor 208 detects that the batch container 34 is properly positioned at the mouth 28 of the respective tray 26.

The PLC 20 processes the signal from the position sensor 24a and actuates the vibratory device 32 attached to the respective tray 26. The tray 26 vibrates and the ingredients move towards the mouth 28 of the tray 26 and falls into the batch container 34. The load cell 36 monitors the weight of the batch container 34 and communicates the weight to the PLC 20. The PLC 20 may process the weight of the batch container 34 to adjust the frequency of the vibratory device 32 and better control the flow of ingredients. For instance, when the load cell 36 detects that the batch container 34 has received almost all of the required ingredient, the PLC 20 will decrease the frequency of the vibratory device 32 so as to reduce the volume of ingredients being dispensed and help ensure the accurate amount of ingredients is used. Once the proper amount of ingredient is dispensed from the bin 22, the PLC 20 will actuate the carriage drive 48 to position the batch container 34 to another tray 26 for additional ingredients. This process continues until all of the recipe ingredients have been gathered.

The batch container 34 may be transferred to the mixing bowl 50 automatically or manually. Once the batch is transferred to the mixing bowl 50, wet ingredients such as milk, water, oil, a liquid formulation of organisms (also referred to in the art as liquid sours), honey, and the like may be added. Once the wet ingredients are added, the PLC 20 may be further operable to actuate the mixing device 16 and mix the wet ingredients with the batch to form a dough 12 of predetermined consistency. As referenced above, the PLC 20 is in communication with a database 210. The database 210 may include specifications for mixing a particular recipe. For example, one recipe may require that the mixing device 16 mix the dough 12 for ten minutes, while another recipe may require the mixing device 16 to mix the dough 12 for twelve minutes.

The PLC 20 actuates the first drive 66 so as to rotate the disc 64, thereby rotating the bowl 50. Thus, the bowl 50 is rotating about the mixer shaft 78. Additionally, the PLC 20 may actuate the second drive 86 so as to rotate the mixer arm 84. Preferably the mixer arm 84 is rotated in the opposite direction as the mixing bowl 50. The PLC 20 is operable to vary the speed and the direction of either the mixing bowl 50 or the mixer arm 84 according to the type of dough being mixed, as it is known that dough recipes require different mixing speeds and duration. During mixing operations, the mixer arm 84 rotates about first longitudinal axis "Y1", and the mixing bowl 50 rotates about second longitudinal axis "Y2" that is parallel and spaced apart from the first longitudinal axis "Y1". The PLC 20 takes into account the dough being mixed. As with most dough recipes, it is desirable during hydration, meaning the introduction of wet ingredients with the batch of dry ingredients, to have the bowl 50 and the mixer arm 84 rotate in the opposite direction. The PLC 20 continues to rotate the bowl 50 and the mixer arm 84 in the opposite direction for a predetermined period of time that is required for proper hydration. Once the predetermined period of time for proper hydration has passed, the PLC 20 may alter the mixing operation to mix the dough into a desired consistency. For instance, the mixing bowl 50 and the mixer arm 84 is rotated in the counterclockwise direction. The PLC 20 may further control speeds at which the bowl 50 and the mixer arm 84 operate.

When the dough 12 is mixed to a desired consistency, the PLC 20 may stop the first drive 66 so as to stop the mixing bowl 50 from rotating. Additionally, the PLC 20 may be further operable to actuate the second drive 86 so as to rotate the mixer arm 84 in an opposite direction to help free the mixer arm 84 of excess dough 12. The PLC 20 is further operable to actuate the tipping drive 92. The tipping drive 92 rotates the mixing bowl 50 about the mounting plates 58 of the housing 52 until the dough 12 is dumped.

As stated above, the dividing container 90 is fixedly mounted to a pair of rails 42. The rails 42 extend between the mixing device 16 and the compressing and dividing device 18. Prior to dumping the dough 12, the PLC 20 actuates the conveyor drive 116 so as to move the conveyor to a receiving position, wherein the dividing container 90 is positioned to receive the dough 12 from the mixing bowl 50. The PLC 20 then actuates the tipping drive 92, thereby rotating the bowl 50 towards the dividing container 90. When the mixing bowl 50 is tilted to a predetermined position. As discussed above, the PLC 20 may rotate the disc 64 and mixer arm 84 between a clockwise and counterclockwise direction so as to perform a rocking motion similar to a washing machine to facilitate the removal of dough from the bowl 50. This operation is beneficial to reducing waste. Once the dough clearing operations have been completed, the PLC 20 further tilts the bowl 50 until the mixed dough 12 is dumped into the dividing container 90.

The machine may further include a plurality of sprayers 220 disposed throughout the inner housing 174. The sprayers 220 are in communication with the PLC 20 and are operable to spray oils onto various surfaces of the machine so as to facilitate the transfer of dough 12. For instance, one sprayer 220 may be configured to spray oil onto the leading edge of the bowl 50 where the dough 12 exits. Another sprayer 220 may be positioned so as to spray the inner sidewall of the elongated chamber to help prevent dough from sticking.

Once the mixed dough 12 has been transferred to the dividing container 90, the PLC 20 actuates the conveyor drive 116 to shuttle the dividing container 90 to the compressing and dividing device 18. Specifically, the conveyor drive 116 moves the first conveyor 108 and dividing container 90 along the rail 42 and away from the receiving position. The PLC 20 moves the first conveyor 108 until the dividing container 90 is registered to receive the inner housing 174. As the first conveyor 108 is moved to the receiving position, yet another sprayer 220 sprays the belt surface so as to facilitate dividing and compressing operations.

The PLC 20 actuates the compressing and dividing device 18 so as to form individual loaves. The compressing and dividing device 18 operates in a cycle, meaning that the compressing and dividing device 18 begins in an initial position and performs a series of operations wherein at the end of the cycle, the compressing and dividing device 18 returns to the initial position. The initial position is also referenced herein as the ready position.

With reference now to FIG. 8, the compressing and dividing device 18 is shown in the ready position. In the ready position, the first and second plates 120, 122 are both fixed to the drive shaft 124. The first plate 120 is spaced a predetermined distance from the second plate 122 and the coupling device 138 is engaged with the retainer 152 so as to fix the first plate 120 to the drive shaft 124. The PLC 20 actuates the drive shaft 124 so as to move the first and second plates 120, 122 away from the conveyor belt 110.

Figure 9:
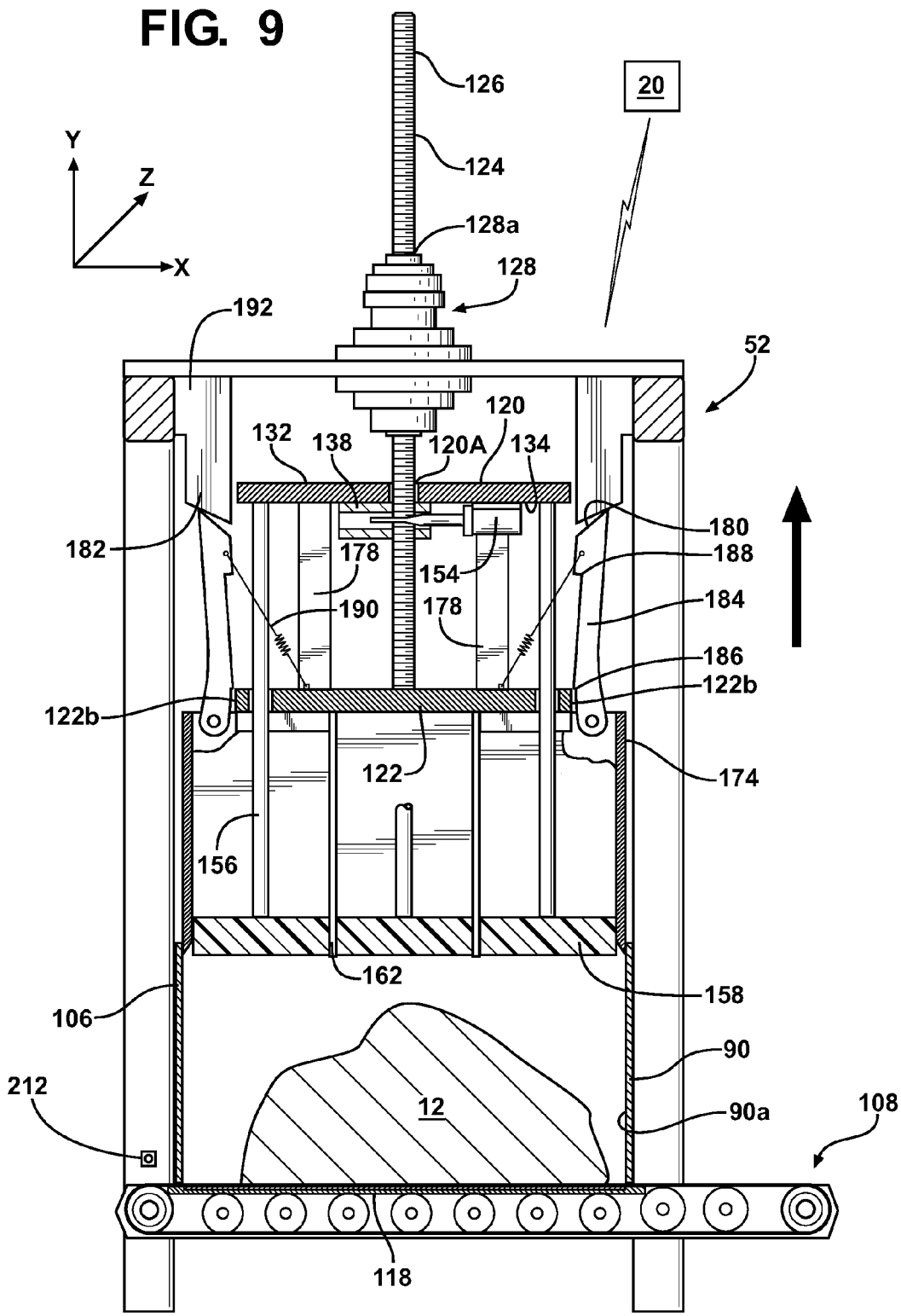
FIG. 9 is a view of FIG. 8, showing the inner housing arms engaging the actuating members.
Figure 10:
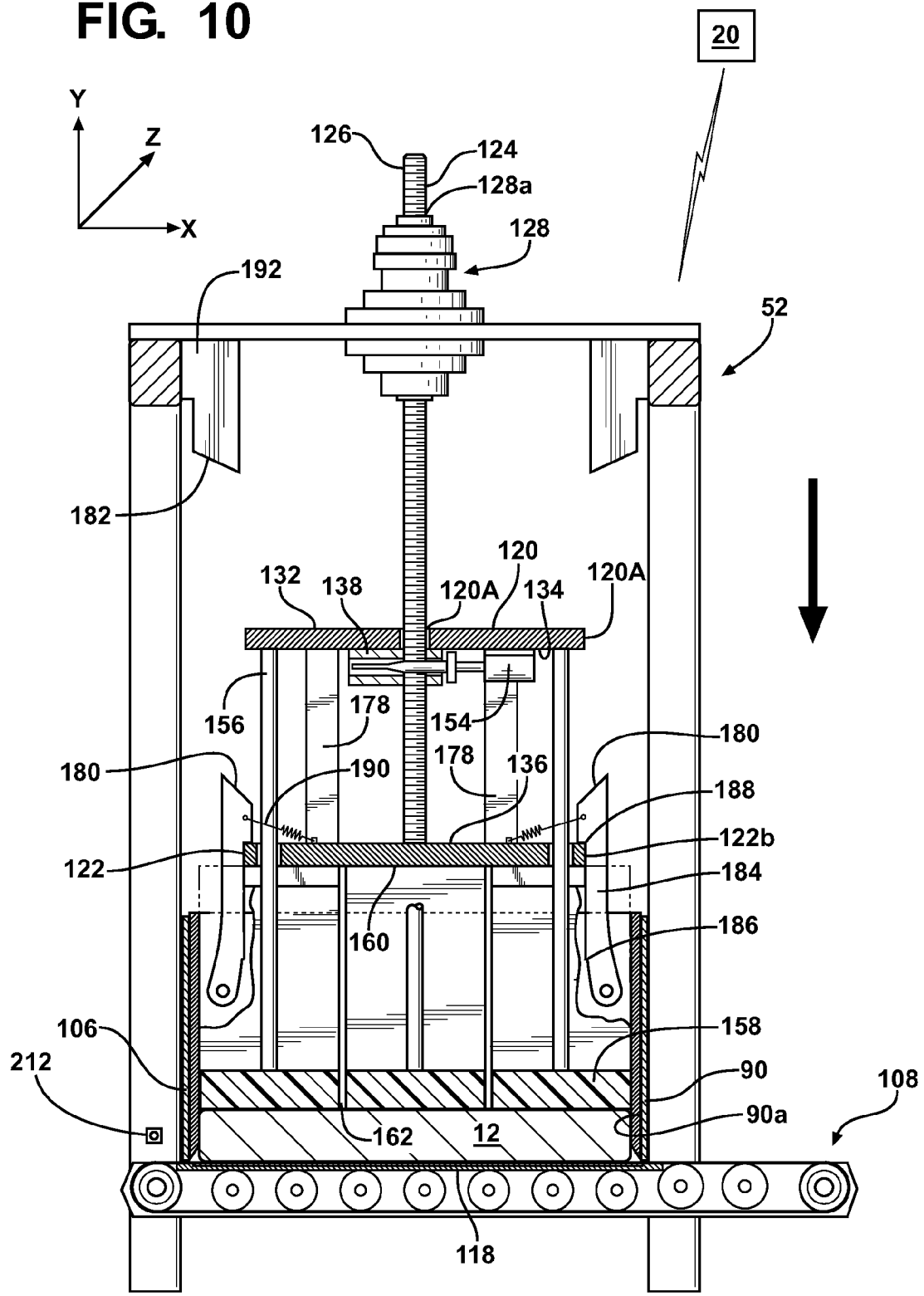
FIG. 10 is a view of FIG. 9, showing the inner housing dropped into the dividing container, and the first and second plates compressing the dough.

As the first and second plates 120, 122 move away from the conveyor belt 110 as indicated by the arrow, the cam surface 180 of the inner housing arm 184 engages the ramped shaped surfaces 182 of the actuating member 192, as shown in FIG. 9. As the drive shaft 124 moves the first and second plates 120, 122 further away from the conveyor belt 110, the inner housing arms 184 are displaced from engagement with the second plate 122. Specifically, the inner housing arms 184 overcome the force of the biasing members 190 and are pivoted away from the side edges 122b of the second plate 122 until the first notch 186 is free of the second plate 122. With reference now to FIG. 10, the actuation of the cam surfaces 180 of the inner housing 174 will be explained. The inner housing 174 drops down onto the conveyor belt 110 as indicated by the arrow, when the first notch 186 is free of the second plate 122 and thus the cam surface 180 of the inner housing arm 184 becomes free of the ramped shaped surface 182 of the actuating members 192. The biasing member 190 is then free to urge the inner housing arms 184 back into engagement with the side edges 122b of the second plate 122. The inner housing arms 184 slide along respective side edges 122b of the second plate 122 until the second notch 188 engages the second plate 122, or the inner housing 174 comes to rest on the conveyor belt 110, and the outer wall surface of the inner housing 174 is then in engagement with the inner wall surfaces 90a of the dividing container 90, as shown in FIG. 10.

Figure 11:
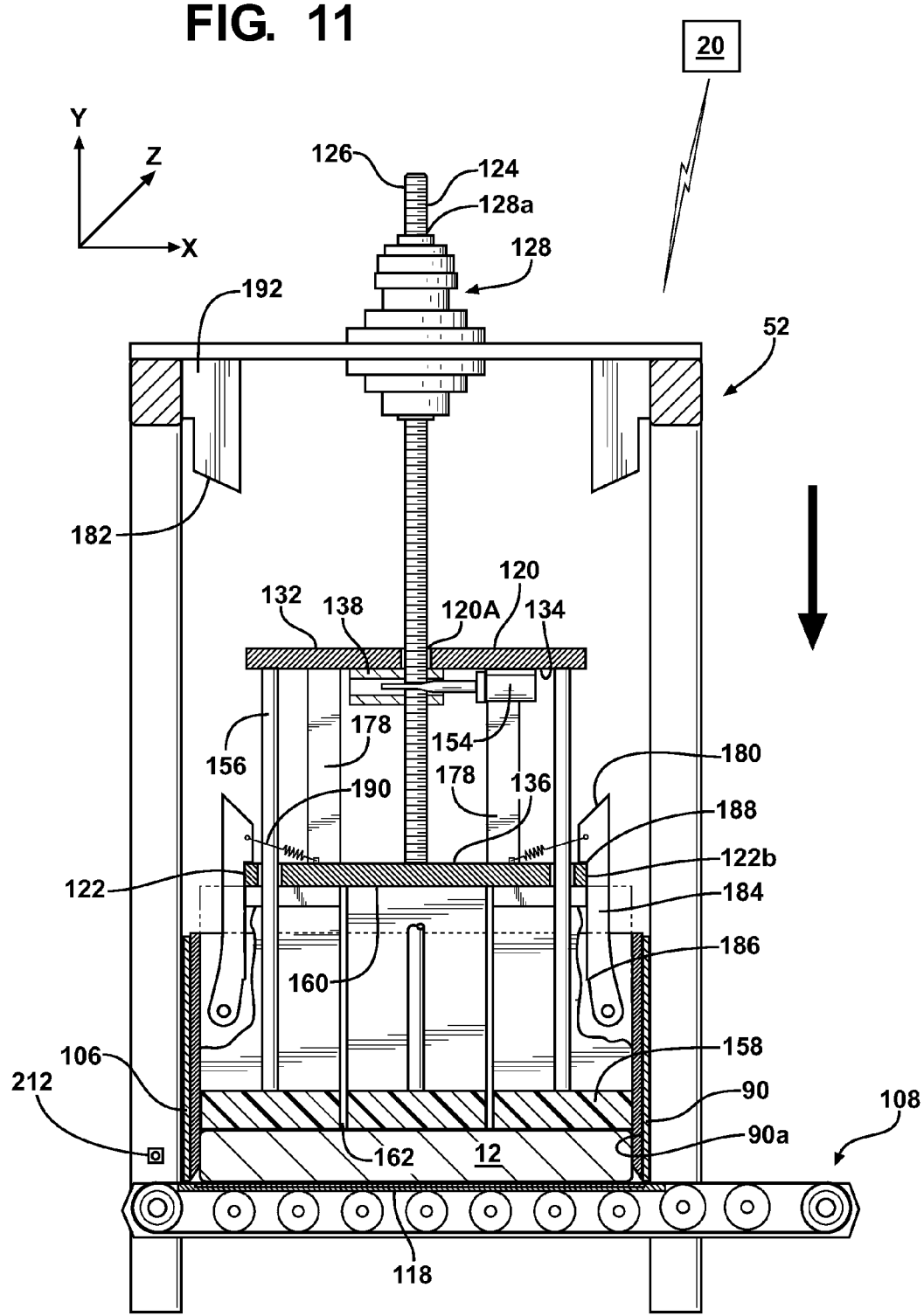
FIG. 11 is a view of FIG. 10, showing the first plate disengaged from the drive shaft.

With reference now to FIG. 11, the PLC 20 then actuates the drive shaft 124 so as to lower the first and second plates 120, 122 toward the dough 12 as indicated by the arrow. The first and second plates 120, 122 are still fixed in a spatial relationship to each other. Specifically, the first plate 120 is spaced apart from the second plate 122 such that the compressing surface of the blocks 158 is flush with the cutting edge of the blades 162 so as to form a generally planar surface. The PLC 20 continues to drive the first and second plate 120, 122 towards the dough 12 so as to compress the dough 12 within the inner housing 174.

With reference again to FIG. 11, disengagement of the first plate 120 with respect to the drive shaft 124 is explained. The drive shaft 124 drives the first and second plates 120, 122 as indicated by the arrow, until the first and second plates 120, 122 can no longer advance. Accordingly, the planar surface formed by the blocks 158 and blades 162 have compressed the dough 12 uniformly within the inner housing 174. When the first and second plates 120, 122 cannot advance, a load is placed on the drive gear assembly. The load is communicated to the PLC 20, and the PLC 20 actuates the coupling device 138 so as to disengage the collar 140 from the retainer 152 and disengage the first plate 120 from the drive shaft 124. The load may be communicated to the PLC 20 in any manner currently known and used in the art. For instance, a pressure sensor may be disposed on the first plate 120. In another example, the PLC 20 may be in communication with a sensor that detects that the drive gear slips. When the PLC 20 detects that the first plate 120 experiences a predetermined load, the PLC 20 actuates the coupling device drive 154 so as to move the collar 140 to the release position.

With reference now to FIG. 12, dough dividing operations are explained. Once the first plate 120 is disengaged from the drive shaft 124, the PLC 20 actuates the drive shaft 124 to continue driving the lower plate towards the compressed dough 12. Specifically, the blades 162 pass through the matrix of blocks 158 and begin dividing the compressed dough 12 into individual loaves. It should be appreciated that compressing the dough 12 uniformly within the inner housing 174 helps ensure that the dough 12 may be divided into uniform individual loaves. Consequently, having uniform individual loaves helps ensure a consistent loaf of bread as the loaves are routinely baked collectively.

The PLC 20 actuates the drive shaft 124 so as to move the second plate 122 away from the conveyor belt 110 after the dough 12 has been divided. As the second plate 122 is pushed into the dough 12, the side edges 122a of the second plate 122 slide along respective inner housing arms 184 until the second plate 122 engages the first notch 186. The biasing member 190 urges the first notch 186 into engagement with the second plate 122 and the inner housing 174 is lifted with the second plate 122 to the ready position.

With reference again to FIGS. 7a and 7b, the operation of the movable wall 106 is explained. As the second plate 122 is lowered to divide the dough 12, the catch 194 is placed into engagement with the respective retaining arms 198. When the second plate 122 is lifted, the catch 194 in turn lifts the movable wall 106 so as to provide an opening 24 for transfer of the dough 12. The PLC 20 then actuates the first conveyor 108 so as to advance individual rows of divided dough 12 to the second conveyor 200.

A position sensor 212 may be provided to control the indexing of the individual rows of dough 12. The position sensor 212 is in communication with the PLC 20. The position sensor 212 may be a laser opposite a receiver. The receiver detects the presence of the laser. The receiver may be disposed on one terminal free end of a sidewall 102, and the laser may be mounted opposite the receiver on the other of the sidewall 102. Alternatively, the position sensor 212 may be mounted on the housing 52. The laser is aimed at the receiver and the receiver detects when a laser signal is not present indicating to the PLC 20 that a particular individual row of dough 12 has not been transferred to the second conveyor. When the receiver detects a signal, the PLC 20 stops the drive belt 110 from advancing the next row of dough 12. This allows the second conveyor time to deposit the dough 12 in the rounder 202.

When all of the rows of dough 12 have been transferred, the PLC 20 actuates the drive shaft 124 to move the first and second plates 120, 122 to the ready position. Each end of the catch 194 may be pivotably attached to opposing ends of the side edges 122a of the second plate 122. When the retaining arms 198 reach the upper limit of the slot 196, the catch 194 is pivoted, and releases the retaining arms 198. The slots 196 guide the retaining arms 198 so as to position the movable wall 106 in a substantially upright manner, so as to position the movable wall 106 to enclose the dividing container 90.

As the second plate 122 is moved towards the ready position, the first plate 120 is disengaged from the drive shaft 124. The drive shaft 124 lifts the second plate 122 and places the spacer 178 in contact with the second surface 160 of the first plate 120. The spacer 178 positions the first plate 120 relative to the second plate 122 such that the coupling device 138 is registered to engage the retainer 152. The PLC 20 further actuates the coupling device drive 154 so as to move the support member 144 to the engaged position wherein the first portion 96 of each engaging arm 142 extends out of respective side openings 150 and into the first passageway 146. A portion of the first portion 96 of each of the engaging arms 142 engages the retainer 152 and fixes the first plate 120 to the drive shaft 124 so as to place the first and second plates 120, 122 in the ready position and complete a cycle of operation.

The PLC 20 actuates the first conveyor 108 to deliver individual rows of dough 12 at a predetermined interval. The predetermined interval allows the second conveyor 200 sufficient time to deliver individual loaves from a particular row to the rounder 206. Thus, the second conveyor 200 is able to clear the way for the following row of divided dough 12. In a preferred embodiment, the second conveyor 200 extends transversal to the end of the first conveyor 108 so as to minimize the amount of space required by the dough processing system 10.

The second conveyor 200 transports the individual rows of dough 12 to the rounder 206. Each loaf in the row is sequentially deposited into the rounder 206 by the second conveyor 200. The rounder 206 kneads the dough 12 and forms the loaves of dough 12 into a ball. The rounder 206 transfers the individual balls of dough 12 onto the rest conveyor 204. The rest conveyor 204 is operable to provide the individual ball of dough 12 with sufficient time for the dough 12 to rise before being transported to the sheeter 208. The rest conveyor 204 travels along a circular path disposed on a vertical plane, and includes a plurality of rest containers (not shown). The rest conveyor 204 accepts a rounded ball of dough 12. Each rest container has a roller disposed at each back portion of the rest container. Each roller rides within a grooved path so as to keep the rest containers aligned along a horizontal plane as the balls of dough 12 are carried along the path of the rest conveyor 204. The path of the rest conveyor 204 includes a grooved portion configured to tilt the rest containers so that the round ball of dough 12 may slide into the sheeter 208. The sheeter 208 molds each individual rounded ball of dough 12 into a loaf of bread ready for baking.

The loaves are then transferred to a proofer 214. The proofer 214 is mounted to the housing 52 and is downstream the sheeter 208. The proofer 214 may include a chamber and a climate control system 216 operable to control the climate in the chamber, such as the humidity, temperature, lighting, and the like. The climate control 216 system is in communication with the PLC 20. The PLC 20 is operable to control the climate control system 216 so as to provide an optimal environment for proofing the loaves prior to baking.

Once the loaves have been proofed, the loaves are then transferred to the oven 218. The oven 218 is mounted within the housing and is downstream the proofer 210. The oven 218 includes a timer 222 and is in communication with the PLC 20. The PLC 20 is operable to bake the loaves at a temperature and for the duration provided by the recipe. Accordingly, the PLC 20 may adjust the temperature of the oven 218 so as to perfect the baking process in accordance with the recipe.

Obviously, many modifications and variations of the present invention are possible in light of the above teachings and may be practiced otherwise than as specifically described while within the scope and spirit of the above teachings.

The invention claimed is:

1. An automated machine for preparing individual loaves of dough for baking, the individual loaves of dough made from a plurality of ingredients, the machine comprising:
   a housing;
   a plurality of bins mounted on the housing, each of the plurality of bins holding one of the plurality of ingredients;
   a mixing device;
   a metering device mounted in the housing for delivering selected quantities of the ingredients from the plurality of bins to the mixing device;
   a compressing and dividing device receiving mixed ingredients from the mixing device, a controller controlling the operation of the metering device, the mixing device, the compressing and dividing device so as to make individual loaves of dough; the compressing and dividing device includes a plurality of blades and blocks, the plurality of blades and blocks mounted to the housing, each of the blocks evenly spaced apart from each other, and the blades are configured to fittingly slide between the spaces of each of the blocks, and the blocks and blades are in communication with the controller, and the controller is operable to drive the blocks and blades so as to compress the dough, and the controller is further operable to drive the blades past the blocks so as to divide the dough;

a first conveyor mounted onto the housing, the first conveyor having a belt and a conveyor drive in communication with the controller, the conveyor drive operable to move the conveyor between a receiving position and a dividing position, and in the receiving position the conveyor is positioned to receive dough from the mixing device and in the dividing position the compressing and dividing device is operable to compress and divide the dough on the belt.

2. The automated machine as set forth in claim 1, whereby the controller is a programmable controller in communication with a database, the database storing recipes for dough.

3. The automated machine as set forth in claim 1, further including a tray, and each of the plurality of bins includes an opening and is configured to hold ingredients for making dough, and the tray is in communication with the opening of the bins.

4. The automated machine as set forth in claim 3, whereby the metering device includes a scale and a vibratory device in communication with the controller, and the vibratory device is operable to selectively vibrate each of the plurality of bins so as to induce the selected ingredients to fall from the tray.

5. The automated machine as set forth in claim 1, whereby the mixing device is mounted onto the housing, the mixing device having a bowl, a mixer arm mounted to the housing so as to be disposed within the bowl, and a tipping drive, the mixer arm operable to rotate along a first plane and the tipping drive operable to rotate the bowl along a second plane orthogonal to the first plane so as to dump the dough from the bowl.

6. The automated machine as set forth in claim 1, whereby the compressing and dividing device further includes a dividing container configured to contain the dough, the dividing container fixedly mounted above the belt, and in the receiving position the dividing container is positioned to receive dough from the mixing bowl, and in the dividing position the dividing container is positioned for compressing and dividing operations.

7. The automated machine as set forth in claim 6, whereby the dough compressing and dividing device further includes an inner housing having a inner housing wall, the inner housing wall having a predetermined thickness, the inner housing wall having an outer wall surface configured to fit within the inner wall surfaces of the dividing container.

8. The automated machine as set forth in claim 7, further including a drive shaft mounted to the housing, the drive shaft in communication with the controller, and the plurality of blocks and the plurality of blades are attached to the drive shaft, the controller operable to actuate the drive shaft and displace the plurality of blocks so as to compress the dough, and the controller further operable to actuate the drive shaft to displace the blades so as to push the blades between the blocks and divide the dough.

9. The automated machine as set forth in claim 8, whereby the dough compressing and dividing device further includes a first plate and a second plate mounted to the drive shaft, and the plurality of blocks are attached to the first plate and the plurality of blades are attached to the second plate.

10. The automated machine as set forth in claim 9, whereby the dough compressing and dividing device further includes a coupling device fixedly mounted to the first plate, the coupling device in communication with the controller, the controller operable to engage and release the first plate with the drive shaft.

11. The automated machine as set forth in claim 10, whereby the inner housing is releasably attached to the second plate so as to drop into the dividing container and line the inner wall surface of the dividing container.

12. The automated machine as set forth in claim 9, whereby the dough compressing and dividing device further includes an inner housing arm and a biasing member, one end of the inner housing arm is pivotably connected to the inner housing, the inner housing arm operable to engage the second plate, the inner housing arm.

13. The automated machine as set forth in claim 12, further including an actuating member attached to the housing, and the housing arm has a first notch spaced apart a second notch, and a cam surface, and the biasing member interconnects the other end of the inner housing arm to the second plate; the actuating member having a ramped shaped surface registered to engage the cam surface of the inner housing arm so as to pivot the inner housing arm and disengage the inner housing from the second plate, and the biasing member, and second notch are operative to engage the inner housing with the second plate so as to displace the inner housing from the dividing container when the second plate is raised.

14. The automated machine as set forth in claim 6, whereby the dividing container further includes an end wall, a pair of sidewalls extending from the end wall, and a movable wall extending between the terminal free ends of the sidewalls, the movable wall operative to be displaced so as to provide an opening for the divided dough to exit.

15. The automated machine as set forth in claim 14, whereby the conveyor is operable to actuate the belt so as to advance the divided dough through the opening.

16. The automated machine as set forth in claim 14, wherein each of the sidewalls includes a slot, and the movable wall includes a pair of retaining arms extending from opposite ends of the movable wall, each of the pair of retaining arms configured to engage respective slots; and a catch pivotably mounted to the second plate, the catch operative to engage the movable wall so as to lift the movable wall and form an opening for dough transfer, and wherein the catch pivots when the retaining arms engage the upper portions of the slot so as to release the movable wall and enclose the dividing container.

17. The automated machine as set forth in claim 2, further including an interface operable to input recipes for various dough mixtures and specifications for preparing each of the recipes, and the programmable controller is operable to adjust the mixing times and mixing speeds to comply with the specifications.

18. The automated machine as set forth in claim 4, further including a pair of spaced apart rails extending longitudinally along a first axis, a batch container slidably mounted to the rails, and the plurality of bins are mounted along the housing and the tray is a plurality of trays, each of the plurality of trays registered to receive ingredients from respective bins, and the batch container is in communication with the controller, and the controller is operable to actuate the batch container so as to position the batch container to receive ingredients from selected trays.

19. The automated machine as set forth in claim 18, further including a carriage drive mounted to the batch container and in communication with the controller, the controller operable to move the batch container along the rails.

20. The automated machine as set forth in claim 19, further including a first position sensor in communication with the controller, the first position sensor mounted to the batch container and operable to detect if the batch container is registered the corresponding tray.

21. The automated machine as set forth in claim 1, further including a belt drive in communication with the controller, the belt drive is operable to rotate the belt so as to forward the divided dough for further processing.

22. The automated machine as set forth in claim 21, further including a second position sensor in communication with the controller, the second position sensor mounted to the housing and operable to detect whether the divided dough has been transferred from the conveyor.

23. The automated machine as set forth in claim 1, further including:
   a second conveyor disposed downstream the compressing and dividing device, the second conveyor in communication with the controller;
   a rounder operable to knead and divided dough into individual balls of dough, the controller actuates the second conveyor so as to deliver divided dough to the rounder;
   a rest conveyor in communication with the rounder, the rest conveyor having a plurality of rest containers operable to receive individual balls of dough; and
   a sheeter in communication with the rest conveyor, the rest conveyor operable to deposit individual balls of dough into the sheeter, wherein the sheeter shapes the individual balls of dough into a loaf.

24. The automated machine as set forth in claim 1 further including an oven mounted within the housing; and the controller is further operable to bake the individual loaves of dough so as to make bread.

25. The automated machine as set forth in claim 5, whereby the bowl further includes an inner wall surface extending from a bottom wall surface, and an inner sidewall defining an elongated chamber disposed within the bowl, the elongated chamber having an aperture in communication with the elongated chamber.

26. The automated machine as set forth in claim 25, whereby the mixing device further includes a mixer shaft disposed within the elongated chamber, the mixer shaft having a support arm, and the mixer arm extends from the support arm so as to be disposed within the bowl.

27. The automated machine as set forth in claim 26, whereby the mixing device further includes a disc and a first drive operatively attached to the disc and the mixer arm, the disc rotatably mounted to the housing and fixedly mounted to the bottom wall surface of the bowl, the first drive in communication with the controller, the controller operable to actuate the disc so as to rotate the bowl and the mixer arm.

28. The automated machine as set forth in claim 27, whereby the mixing device further includes a second drive, the second drive operatively connected to the mixer arm and in communication with the controller.

29. The automated machine as set forth in claim 28, whereby the housing further includes a pair of spaced apart first support members, and a second support member extending between the pair of first support members, and each of the pair of spaced apart first support members further includes a mounting plate disposed along the second plane.

30. The automated machine as set forth in claim 29, further including a platform supporting the bowl, the platform having a pair of platform arms configured to engaged respective mounting plates, the platform disposed between the pair of mounting plates.

31. The automated machine as set forth in claim 1, further including a support plate disposed underneath a portion of the belt, the support plate formed of a durable material and operative to facilitate dough dividing operations.

32. The automated machine as set forth in claim 31, whereby the support plate includes a support pad, the support pad formed of a polymer.

33. The automated machine as set forth in claim 3, whereby the tray includes a body having an end wall extending substantially upright from the body so as to define a corner, and a mouth opposite the corner, the body is angled relative to the mouth, and the mouth is disposed above the corner of the body.

34. The automated machine as set forth in claim 10, whereby each of the plurality of blades includes a blade edge operable to divide the dough, and each of the plurality of blocks includes a planar surface operative to compress the dough.

35. The automated machine as set forth in claim 29, further including a spacer disposed between the second plate and the first plate, the spacer having an elongated member, one end of the elongated member is fixedly attached to the second plate, the other end of the spacer is spaced a predetermined distance from the second plate so as to place the blade edges in alignment with the planar surface of the blocks when the first plate is coupled to the drive shaft.

36. The automated machine as set forth in claim 10, further including a retainer mounted to the drive shaft, and the coupling device further includes a collar, the collar having an elongated body member having a first passageway configured to receive the drive shaft, and a pair of side passageways extending along an axis orthogonal to the drive shaft, each of the pair of side passageways having a side opening in communication with the first passageway, the side openings are spaced apart and opposite each other;
   a pair of engaging arms mounted to a support member, each of the pair of engaging arms disposed within respective side passageways of the collar, and each of the pair of engaging arms having a first portion and a second portion, the first and second portions having a radius, the first portions are spaced apart from each other and are attached to the support member, and the radius of the first portion is greater than the radius of the second portions, and
   a coupling device drive in communication with the controller, the coupling device drive operable to move the engaging arms between an engaged position and a release position, in the engaged position a portion of each of the first portion of the engaging arms are disposed within respective side openings and engage the retainer so as to fix the first plate to the drive shaft, and in the release position, a portion of the second portion of the engaging arms is disposed within respective side openings, and the retainer is free of engagement with the engaging arms and the first plate is disengaged from the drive shaft.

37. The automated machine as set forth in claim 14, further including a servo motor, the servo motor attached to the dividing container and operable to displace the movable wall so as to provide an opening for the transfer of divided dough.

38. The automated machine as set forth in claim 1, whereby the blades are formed from a plurality of panels, the plurality of panels corresponding to the number of spaces between the blocks, and each of the plurality of panels is configured to fit within a respective space between the blocks.

39. The automated machine as set forth in claim in claim 17, further including at least one sprayer, each of the at least one sprayer mounted to the housing so as to deliver oil to selected surfaces of the automated machine.

40. The automated machine as set forth in claim in claim 39, further including a temperature control operable to control the temperature of the wet ingredients.

41. The automated machine as set forth in claim 40, whereby the programmable controller is further operable to selectively actuate any one of the at least one sprayer, and to control the temperature control.

42. A compressing and dividing device for compressing and dividing dough into discrete loaves of dough, the compressing and dividing device comprising:
  a plurality of blades and blocks mounted to a housing, each of the blocks evenly spaced apart from each other, and the blades are configured to fittingly slide between the spaces of each of the blocks;
  a controller configured to control both the movement of the blocks and the movement of the plurality of blades with respect to the blocks; and
  a dividing container configured to contain the dough, the dividing container disposed beneath the plurality of blades and blocks, the plurality of blades and blocks dimensioned to slidingly fit within an inner wall of the dividing container, the blocks and blades are in communication with the controller, and the controller is operable to drive the blocks and blades so as to compress the dough within the dividing container, and the controller is further operable to drive the plurality of blades past the blocks so as to divide the dough within the dividing container.

43. The compressing and dividing device as set forth in claim 42, further including a first conveyor mounted onto the housing, the first conveyor having a belt and a conveyor drive in communication with the controller, the conveyor drive operable to move the conveyor between a receiving position and a dividing position, and in the receiving position the conveyor is positioned to receive dough from the mixing device and in the dividing position the compressing and dividing device is operable to compress and divide the dough.

44. The compressing and dividing device as set forth in claim 43, further including a drive shaft mounted to the housing, the drive shaft in communication with the controller, and the plurality of blocks and the plurality of blades are attached to the drive shaft, the controller operable to actuate the drive shaft and displace the plurality of blocks so as to compress the dough, and the controller further operable to actuate the drive shaft to displace the blades so as to push the blades between the blocks and divide the dough.

45. The compressing and dividing device as set forth in claim 44, wherein the dividing container further includes an end wall, a pair of sidewalls extending from the end wall, and a movable wall extending between the terminal free ends of the sidewalls, the movable wall operative to be displaced so as to provide an opening for the divided dough to exit.

* * * * *

UNITED STATES PATENT AND TRADEMARK OFFICE
CERTIFICATE OF CORRECTION

PATENT NO. : 8,739,696 B2
APPLICATION NO. : 13/125943
DATED : June 3, 2014
INVENTOR(S) : Rick Anderson et al.

It is certified that error appears in the above-identified patent and that said Letters Patent is hereby corrected as shown below:

In the Claims:

At column 22, claim number 20, line number 64, After registered, Insert --to--

At column 23, claim number 23, line number 13, Delete "divided", Insert --divide--

At column 23, claim number 30, line number 58, Delete "engaged", Insert --engage--

At column 24, claim number 39, line number 59, Delete second occurrence of "in claim"

At column 24, claim number 40, line number 63, Delete second occurrence of "in claim"

Signed and Sealed this
Twenty-third Day of June, 2015

Michelle K. Lee
*Director of the United States Patent and Trademark Office*